US010893523B2

(12) United States Patent
Yerramalli et al.

(10) Patent No.: US 10,893,523 B2
(45) Date of Patent: Jan. 12, 2021

(54) WIRELESS COMMUNICATION BETWEEN WIDEBAND ENB AND NARROWBAND UE

(71) Applicant: QUALCOMM Incorporated, San Diego, CA (US)

(72) Inventors: Srinivas Yerramalli, San Diego, CA (US); Tamer Kadous, San Diego, CA (US); Chih-Hao Liu, San Diego, CA (US); Chirag Patel, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/635,000

(22) Filed: Jun. 27, 2017

(65) Prior Publication Data
US 2018/0124789 A1     May 3, 2018

Related U.S. Application Data

(60) Provisional application No. 62/416,651, filed on Nov. 2, 2016.

(51) Int. Cl.
*H04W 72/04* (2009.01)
*H04W 74/08* (2009.01)
(Continued)

(52) U.S. Cl.
CPC ........ *H04W 72/0453* (2013.01); *H04B 1/713* (2013.01); *H04L 1/12* (2013.01);
(Continued)

(58) Field of Classification Search
CPC ... H04W 4/70; H04W 28/26; H04W 72/0446; H04W 72/0453; H04W 72/0413;
(Continued)

(56) References Cited

U.S. PATENT DOCUMENTS 7,020,110 B2  3/2006  Walton et al.
7,177,297 B2  2/2007  Agrawal et al.
(Continued)

FOREIGN PATENT DOCUMENTS

EP    2031775 A1    3/2009
GB    2457011 A     8/2009
(Continued)

OTHER PUBLICATIONS

Intel Corporation, LBT design for LAA downlink, R1-151104, 3GPP TSG RAN WG1 Meeting Ad-hoc R1-151104 Paris, France, Mar. 24-26, 2015 (Year: 2015).*
(Continued)

*Primary Examiner* — Oussama Roudani
(74) *Attorney, Agent, or Firm* — Arent Fox, LLP; Nerrie M. Zohn

(57) ABSTRACT

A method and apparatus for wireless communication in the unlicensed spectrum between an eNB and UEs having different bandwidths, e.g., between a narrowband UE and a wideband eNB. A base station apparatus may perform a dual CCA procedure for a frame, wherein the dual CCA procedure comprises a first type of CCA procedure followed by a second type of CCA procedure when the first type of CCA procedure is unsuccessful. The apparatus may transmit during the frame when at least one CCA procedure of the dual CCA procedure is successful and may refrain from transmitting during the frame when both CCA procedures of the dual CCA procedure are unsuccessful. In performing the dual CCA procedure, the apparatus may perform CCA for a first period of time then perform eCCA for a second period of time following the CCA, when the CCA is unsuccessful.

36 Claims, 30 Drawing Sheets

US 10,893,523 B2
Page 2

(51) Int. Cl.

| | | |
|---|---|---|
| *H04W 4/70* | (2018.01) | |
| *H04W 28/26* | (2009.01) | |
| *H04W 16/14* | (2009.01) | |
| *H04W 88/02* | (2009.01) | |
| *H04W 88/08* | (2009.01) | |
| *H04L 1/12* | (2006.01) | |
| *H04B 1/713* | (2011.01) | |
| *H04L 1/18* | (2006.01) | |
| *H04L 29/08* | (2006.01) | |
| *H04L 5/00* | (2006.01) | |
| *H04L 5/14* | (2006.01) | |

(52) U.S. Cl.
CPC ............ *H04L 1/189* (2013.01); *H04L 5/0048* (2013.01); *H04L 67/12* (2013.01); *H04W 4/70* (2018.02); *H04W 28/26* (2013.01); *H04W 72/042* (2013.01); *H04W 72/048* (2013.01); *H04W 72/0413* (2013.01); *H04W 72/0446* (2013.01); *H04W 74/0808* (2013.01); *H04L 5/001* (2013.01); *H04L 5/0023* (2013.01); *H04L 5/14* (2013.01); *H04W 16/14* (2013.01); *H04W 88/02* (2013.01); *H04W 88/08* (2013.01)

(58) Field of Classification Search
CPC . H04W 72/042; H04W 72/048; H04W 16/14; H04W 74/0808; H04W 88/02; H04W 88/08; H04L 1/12; H04L 5/00; H04L 67/12; H04L 5/0048; H04B 1/713
See application file for complete search history.

(56) References Cited

U.S. PATENT DOCUMENTS

| | | | |
|---|---|---|---|
| 9,491,752 | B2 | 11/2016 | Damnjanovic et al. |
| 9,648,500 | B2 | 5/2017 | Chen et al. |
| 2005/0025081 | A1 | 2/2005 | Wakamatsu |
| 2007/0053414 | A1 | 3/2007 | Payne et al. |
| 2012/0327894 | A1 | 12/2012 | Axmon et al. |
| 2013/0208687 | A1 | 8/2013 | Kwon et al. |
| 2013/0272204 | A1 | 10/2013 | MacMullen et al. |
| 2014/0329555 | A1 | 11/2014 | Gao et al. |
| 2015/0334744 | A1* | 11/2015 | Ji ................. H04W 74/085 370/336 |
| 2016/0081101 | A1 | 3/2016 | Yu |
| 2016/0219587 | A1 | 7/2016 | Lin et al. |
| 2016/0248807 | A1 | 8/2016 | Jover et al. |
| 2016/0337157 | A1 | 11/2016 | Papasakellariou |
| 2016/0373235 | A1 | 12/2016 | Oh et al. |
| 2017/0280448 | A1 | 9/2017 | Takeda et al. |
| 2017/0290059 | A1* | 10/2017 | Karaki .............. H04W 74/0816 |
| 2017/0339588 | A1* | 11/2017 | Moon ................... H04W 88/02 |
| 2017/0347355 | A1* | 11/2017 | Gou .................. H04W 72/0446 |
| 2018/0063824 | A1 | 3/2018 | Kim et al. |
| 2018/0092128 | A1 | 3/2018 | Um et al. |
| 2018/0110057 | A1 | 4/2018 | Park et al. |
| 2018/0124770 | A1 | 5/2018 | Yerramalli et al. |
| 2018/0124776 | A1 | 5/2018 | Yerramalli et al. |
| 2018/0124777 | A1 | 5/2018 | Yerramalli et al. |
| 2018/0139725 | A1 | 5/2018 | Takeda et al. |
| 2018/0176890 | A1* | 6/2018 | Moon ................... H04L 1/1893 |
| 2018/0176947 | A1 | 6/2018 | Yu et al. |
| 2018/0220404 | A1 | 8/2018 | Awad et al. |
| 2018/0220459 | A1* | 8/2018 | Park ..................... H04W 74/00 |
| 2018/0242357 | A1 | 8/2018 | Khirallah et al. |
| 2018/0249509 | A1 | 8/2018 | Yi |
| 2018/0263061 | A1 | 9/2018 | Moroga et al. |
| 2019/0028143 | A1 | 1/2019 | Zhang et al. |
| 2019/0162817 | A1 | 5/2019 | Priyanto et al. |

FOREIGN PATENT DOCUMENTS

| | | |
|---|---|---|
| JP | 2005026862 A | 1/2005 |
| JP | 2016001929 A | 1/2016 |
| KR | 20150087795 A | 7/2015 |
| KR | 20150087805 A | 7/2015 |
| WO | 03058871 A1 | 7/2003 |
| WO | WO-2004102816 A2 | 11/2004 |
| WO | 2008122841 A1 | 10/2008 |
| WO | WO-2014058708 A1 | 4/2014 |
| WO | 2015050771 A1 | 4/2015 |
| WO | 2015050772 A1 | 4/2015 |
| WO | 2015061293 A1 | 4/2015 |
| WO | 2015126783 A1 | 8/2015 |
| WO | 2016047727 A1 | 3/2016 |
| WO | 2016171813 A1 | 10/2016 |
| WO | WO-2016161630 A1 | 10/2016 |
| WO | WO-2016164739 A1 | 10/2016 |

OTHER PUBLICATIONS

COOLPAD: "Discussion on the Enhancements of LBT Schemes", 3GPP Draft; R1-153308 Discussion on the Enhancements of LBT Schemes, 3rd Generation Partnership Project (3GPP), Mobile Competence Centre, 650, Route Des Lucioles, F-06921, Sophia-Antipolis Cedex, France, vol. RAN WG1, No. Fukuoka, Japan; May 25, 2015-May 29, 2015 May 24, 2015, XP050972024, Retrieved from the Internet: URL:http://www.3gpp.org/ftp/Meetings_3GPP_SYNC/RAN1/Docs/ [retrieved on May 24, 2015], 4 pages.

Huawei et al: "Analysis on LBT with Category 2 and 4 for eLAA", 3GPP Draft; R1-160297, 3rd Generation Partnership Project (3GPP), Mobile Competence Centre, 650 Route Des Lucioles, F-06921, Sophia-Antipolis Cedex, vol. RAN WG1, No. St. Julian's, Malta, Feb. 15, 2016-Feb. 19, 2016, Feb. 14, 2016 (Feb. 14, 2016), XP051053637, 5 pages, Retrieved from the Internet: URL:http://www.3gpp.org/ftp/Meetings_3GPPSYNC/RAN1/Docs/, [retrieved on Feb. 14, 2016].

Intel Corporation: "LBT Design for LAA Downlink", 3GPP Draft; R1-151104, Intel-LBT, 3rd GenerationPartnership Project (3GPP), Mobile Competence Centre, 650 Route Des Lucioles, F-06921, Sophia-Antipolis Cedex, vol. RAN WG1, No. Paris, France, Mar. 24, 2015-Mar. 26, 2015, Mar. 18, 2015 (Mar. 18, 2015), XP050951443, 7 pages, Retrieved from the Internet: URL:http://www.3gpp.org/ftp/tsg_ran/WG1_RL1/TSGR1_AH/LTE_LAA_1503/Docs/, [retrieved on Mar. 18, 2015].

International Search Report and Written Opinion—PCT/US2017/058835—ISA/EPO—dated Feb. 2, 2018.

LG Electronics: "Narrowband Definition and Hopping Pattern Across Narrowbands", 3GPP Draft; R1-152694, Narrowband and Hopping V2, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015 May 16, 2015, XP050973944, Retrieved from the Internet: URL:http://www.3gpp.org/ftp/tsg_ran/WG1_RL1/TSGR1_81/Docs/ [retrieved on May 16, 2015], 5 pages.

Nokia Networks: "LBT Requirements for LAA", 3GPP Draft; R4-157765, 3rd Generation Partnership Project (3GPP), Mobile Competence Centre, 650 Route Des Lucioles, F-06921, Sophia-Antipolis Cedex, vol. Ran WG4, No. Anaheim, US, Nov. 16, 2015-Nov. 20, 2015, Nov. 16, 2015 (Nov. 16, 2015), XP051010307, 3 pages, Retrieved from the Internet: URL:http://www.3gpp.org/ftp/Meetings_3GPPSYNC/RAN4/Docs/, [retrieved on Nov. 16, 2015].

Spreadtrum Communications: "Discussion on Open Issues in MTC PDSCH", 3GPP Draft; R1-157333 Discussion on Open Issues in MTC PDSCH, 3rd Generation Partnership Project (3GPP), Mobile Competence Centre, 650 Route Des Lucioles, F-06921, Sophia-Antipolis Cedex, France, vol. RAN WG1, No. Anaheim, California, USA; Nov. 16, 2015-Nov. 20, 2015 Nov. 15, 2015, XP051003525, Retrieved from the Internet: URL:http://www.3gpp.org/ftp/Meetings_3GPP_SYNC/RAN1/Docs/ [retrieved on Nov. 15, 2015], 6 pages.

ZTE: "Control Signalling and HARQ Related Issues for Licensed-Assisted Access Using LTE", R1-151810, 3GPP TSG RAN WG1 Meeting #80bis, Belgrade, Serbia, Apr. 20-Apr. 24, 2015, 5 Pages.

(56) References Cited

OTHER PUBLICATIONS

Alcatel-Lucent Shanghai Bell et al., "UL LBT and DL/UL Frame Structure for LAA," 3GPP Draft, 3GPP TSG RAN WG1 Meeting #82, R1-154574 UL LBT—Final, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 25, 2015-Aug. 28, 2015 Aug. 23, 2015 (Aug. 23, 2015), XP051039505, pp. 1-6, Retrieved from the Internet: URL:http://www.3gpp.org/ftp/Meetings_3GPP_SYNC/RAN1/Docs/ [retrieved on Aug. 23, 2015].

Huawei, Hisilicon: "Discussion on the application of LBT options in eLAA", 3GPP TSG RAN WG1 84bis Meeting, R1-162602, Busan, Korea, Apr. 11-15, 2016, 3 Pages.

Intel Corporation: "Comparison of evaluation results for various UL LBT options", 3GPP TSG RAN WG1 Meeting #81, R1-153439, Fukuoka, Japan, May 25-29, 2015, pp. 1-9.

Intel Corporation: "On the LAA UL: LBT, scheduling, and subframe structure", 3GPP TSG RAN WG1 Meeting #81, R1-152649, Fukuoka, Japan, May 25-29, 2015, pp. 1-4.

Samsung: "Discussion on enhanced Cat 2-based UL LBT", 3GPP TSG RAN WG1 Meeting #84, R1-160570, St Julian's, Malta, Feb. 15-19, 2016, pp. 1-5.

Samsung: "Discussion on LBT for UL transmission", 3GPP TSG RAN WG1 Meeting #82bis, R1-155461, Malmö, Sweden, Oct. 5-9, 2015, pp. 1-5.

ZTE: "Discussion on the UL LBT for LAA", 3GPP TSG RAN WG1 Meeting #85, R1-164603, Nanjing, China May 23-27, 2016, pp. 1-10.

Ericsson: "Coexistence Evaluation Results for DL-only LAA and DL-only Wi-Fi", 3GPP TSG RAN WG1 Meeting #80bis, 3GPP Draft; R1-152351, 3rd Generation Partnership Project (3GPP), Mobile Competence Centre; 650, Route Des Lucioles; F-06921 Sophia-Antipolis Cedex; France vol. RAN WG1, No. Belgrade, Serbia, Apr. 25, 2015 (Apr. 25, 2015), 94 Pages, XP050950548, Apr. 20, 2015-Apr. 25, 2015, Retrieved from the Internet: URL: http://www.3gpp.org/ftp/tsg_ran/WG1_RL1/TSGR1_80b/Docs/ [retrieved on Apr. 25, 2015].

Huawei, et al., "Contention Window Size Adjustment for UL Category 4 LBT for eLAA", 3GPP TSG RAN WG1 Meeting #85, 3GPP Draft, R1-164073, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016 (May 14, 2016), XP051096611, 4 Pages, May 23, 2016-May 27, 2016, Retrieved from the Internet: URL: http://www.3gpp.org/ftp/tsg_ran/WG1_RL1/TSGR1_85/Docs/ [retrieved on May 14, 2016], section 2.

ZTE: "Consideration of LBT failure in LAA UL HARQ operation", 3GPP TSG RAN WG1 Meeting #85, R1-164573, Nanjing, China, May 23-27, 2016, 4 Pages.

* cited by examiner

WIRELESS COMMUNICATION BETWEEN WIDEBAND ENB AND NARROWBAND UE

CROSS-REFERENCE TO RELATED APPLICATION

This application claims the benefit of U.S. Provisional Application Ser. No. 62/416,651, entitled "WIRELESS COMMUNICATION BETWEEN WIDEBAND ENB AND NARROWBAND UE" and filed on Nov. 2, 2016, which is expressly incorporated by reference herein in its entirety.

BACKGROUND

Field

The present disclosure relates generally to communication systems, and more particularly, to wireless communication between a base station and User Equipment (UE) having different bandwidths, e.g., between a wideband base station and a narrowband UE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

In Narrow Band (NB) wireless communication, such as narrow band internet-of-things (NB-IoT) or enhanced Machine-Type Communications (eMTC), wireless communications may involve limited bandwidth. For example, in NB-IoT, wireless communication may be limited to a single Resource Block (RB). In eMTC, communication may be limited to six RBs. Such limited resources lead to unique challenges in transmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein provide the ability use an unlicensed or shared radio frequency spectrum band, providing opportunities for enhanced data transmission capacity, and also addresses the unique challenges in transmitting narrow band wireless communication. Aspects provide for communication between a base station and UEs having different bandwidths in the unlicensed spectrum, e.g., between a wideband base station and narrow band UEs. The communication may comprise Internet of Things (IoT) communication, e.g., NB-IoT, eMTC, etc. By enabling wideband base stations to serve narrow band UEs using the unlicensed spectrum, larger numbers of UEs may be served by fewer base stations.

In an aspect of the disclosure, a method, a computer-readable medium, and an apparatus for wireless communication at an base station are provided. The apparatus performs a dual CCA procedure for a frame, wherein the dual CCA procedure comprises a first type of CCA procedure followed by a second type of CCA procedure when the first type of CCA procedure is unsuccessful. The apparatus may transmit during the frame when at least one CCA procedure of the dual CCA procedure is successful and may refrain from transmitting during the frame when both CCA procedures of the dual CCA procedure are unsuccessful. In performing the dual CCA procedure, the apparatus may perform CCA for a first period of time then perform eCCA for a second period of time following the CCA, when the CCA is unsuccessful.

In another aspect of the disclosure, a method, a computer-readable medium, and an apparatus for wireless communication at user equipment are provided. The apparatus segments an uplink duration in each frame into multiple transmission units for each frequency, wherein a frame comprises an integer number of the transmission units. The apparatus then transmits uplink communication based on the multiple transmission units, wherein each transmission unit comprises at least one on period and at least one off period corresponding to each of a plurality of frequencies, wherein during an on period the UE transmits uplink communication on the corresponding frequency and during an off period the UE refrains from transmitting uplink communication on the corresponding frequency.

In another aspect of the disclosure, a method, a computer-readable medium, and an apparatus for wireless communication at a user equipment is provided. The apparatus transmits uplink transmissions in a plurality of transmission units and hops frequency bands in a first pattern across frames based on a base station hopping pattern. The uplink transmissions may be transmitted based on dual hopping patterns, and the apparatus may further hop in a second pattern across transmission units within the base station's channel occupancy within a frame.

In another aspect of the disclosure, a method, a computer-readable medium, and an apparatus for wireless communication at a base station are provided. The apparatus hops frequency bands in a first pattern across frames based on a base station hopping pattern and receives uplink transmissions in a narrowband from a user equipment in a plurality of transmission units within the frequency bands based on the base station hopping pattern. The uplink transmission may be received from the user equipment based on dual hopping patterns, and the apparatus may hop in a second pattern across transmission units within the base station's channel occupancy within a frame. The uplink transmission may be received from the user equipment in the same narrowband within the corresponding channel occupancy of the base station in each frame. The base station may comprise a wideband base station, and the apparatus may further multiplex communication with a plurality of narrowband UEs.

In another aspect of the disclosure, a method, a computer-readable medium, and an apparatus for wireless communication at a base station are provided. The apparatus performs a Listen-Before-Talk (LBT) procedure at a beginning of each of a plurality of frames. The apparatus transmits a plurality of repetitions of a transmission, wherein when the plurality of repetitions span multiple frames and the LBT procedure is not successful for a first frame, the base station drops at least one repetition in the first frame or postpones the at least one repetition in the first frame until a second frame when the LBT procedure is successful.

In another aspect of the disclosure, a method, a computer-readable medium, and an apparatus for wireless communication at a user equipment are provided. The apparatus receives a plurality of repetitions of a downlink transmission from a base station. When the plurality of repetitions span multiple frames, the apparatus determines whether the base station transmits at least one repetition of the downlink transmission in a first frame. The determining may include determining whether the base station drops the at least one repetition in the first frame or postpones the at least one repetition in the first frame until a second frame. The apparatus may combine the plurality of repetitions across the multiple frames.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
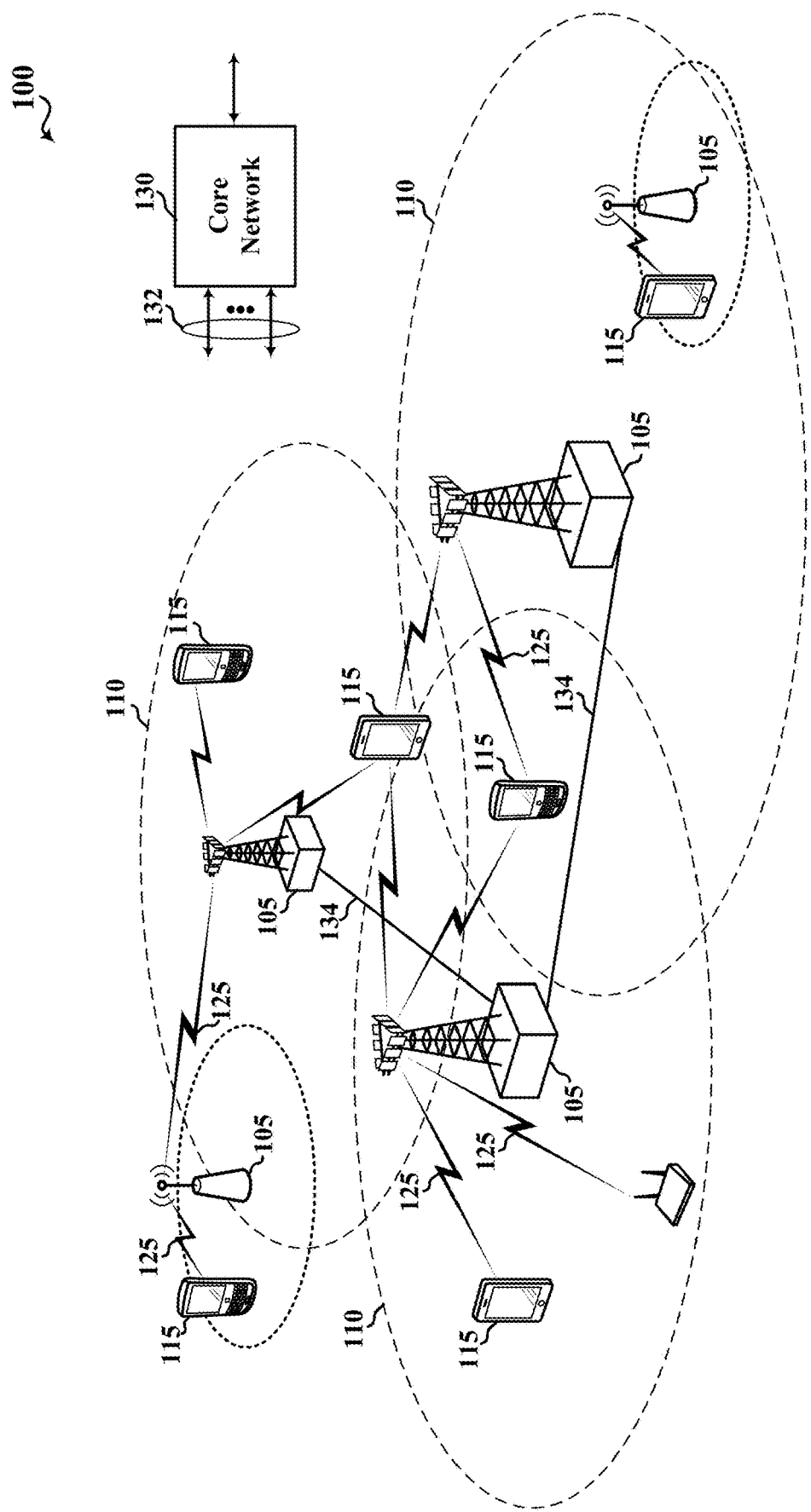
FIG. 1 shows a diagram that illustrates an example of a wireless communications system according to various aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for LTE communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as Wi-Fi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an eCCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or eCCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNB, a Home NodeB, a Home eNB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include DL transmissions, from a base station 105 to a UE 115, or UL transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or an SR or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as Wi-Fi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
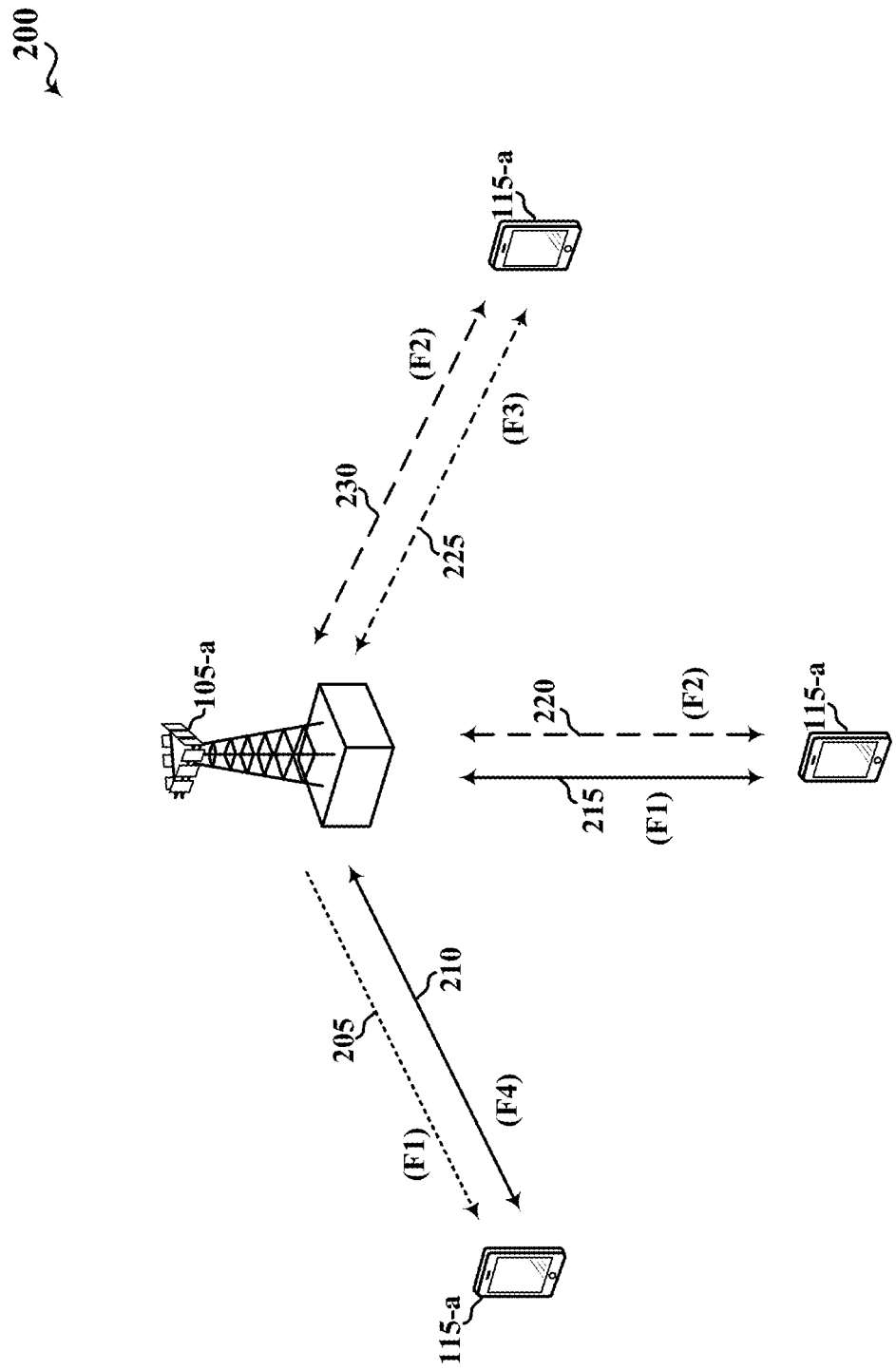
FIG. 2A shows a diagram that illustrates examples of deployment scenarios for using LTE in an unlicensed spectrum according to various aspects of the present disclosure.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1.

Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE PCC on the non-contention spectrum and the LTE SCC on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement LBT or carrier sense multiple access (CSMA) requirements on the UE. However, LBT may be implemented on the base station (e.g., eNB) by, for example, using a periodic (e.g., every 10 milliseconds) CCA and/or a grab-and-relinquish mechanism aligned to a radio frame boundary.

In the CA mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
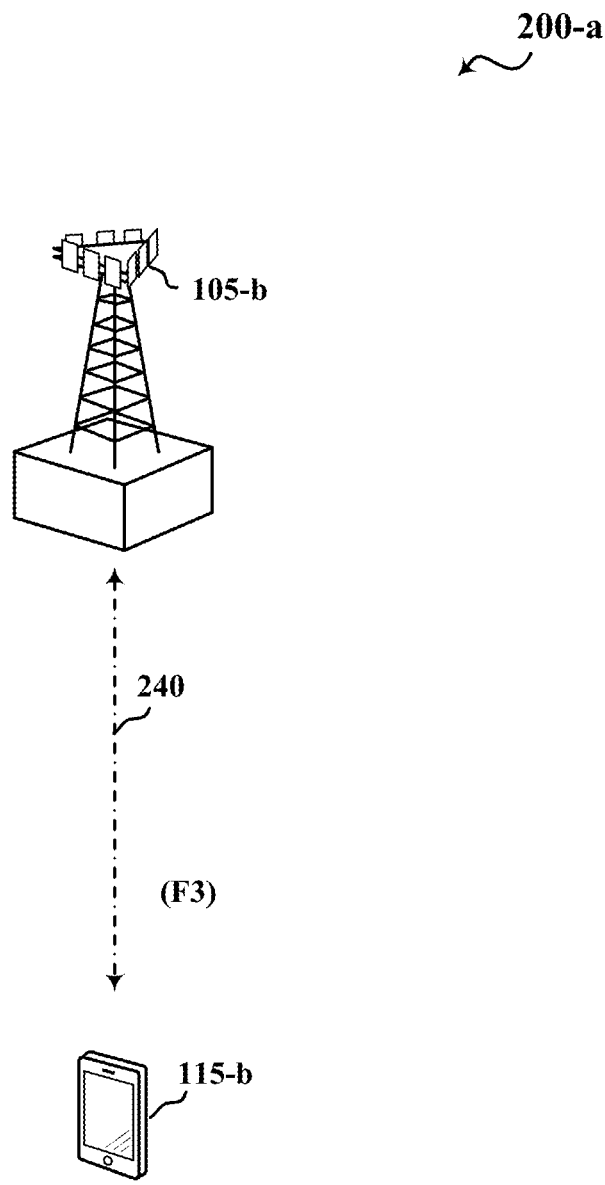
FIG. 2B shows a diagram that illustrates another example of a deployment scenario for using LTE in an unlicensed spectrum according to various aspects of the present disclosure.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105, 205, or 205-a described with reference to FIG. 1, 2A, or 2B, or one of the UEs 115, 215, 215-a, 215-b, or 215-c described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
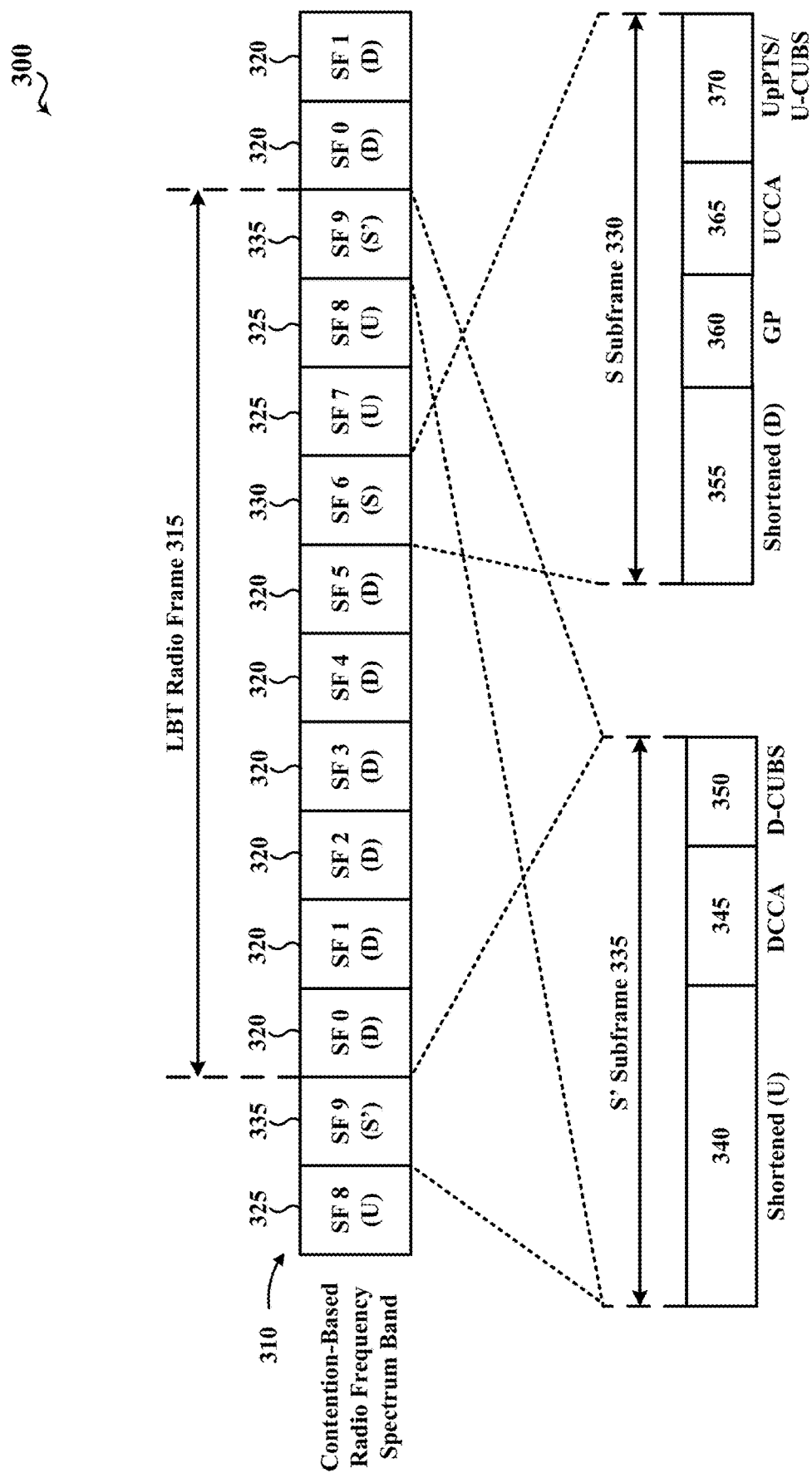
FIG. 3 shows a diagram that illustrates an example of carrier aggregation when using LTE concurrently in licensed and unlicensed spectrum according to various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a CUBS (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened UL (U) period 340. A second portion of the S' subframe 335 may be used for the DL CCA procedure 345. A third portion of the S' subframe 335 may be used by one or more base stations that successfully contend for access to the channel of the contention-based shared radio frequency spectrum band to transmit the D-CUBS 350.

During the S subframe 330, an UL CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful UL CCA procedure 365 by a UE, the UE may transmit a preamble, such as an UL CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the UL CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened DL (D) period 355. A second portion of the S subframe 330 may be used as a guard period (GP) 360. A third portion of the S subframe 330 may be used for the UL CCA procedure 365. A fourth portion of the S subframe 330 may be used by one or more UEs that successfully contend for access to the channel of the contention-based radio frequency spectrum band as an UL pilot time slot (UpPTS) or to transmit the U-CUBS 370.

In some examples, the downlink CCA procedure 345 or the UL CCA procedure 365 may include the performance of a single CCA procedure. In other examples, the DL CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
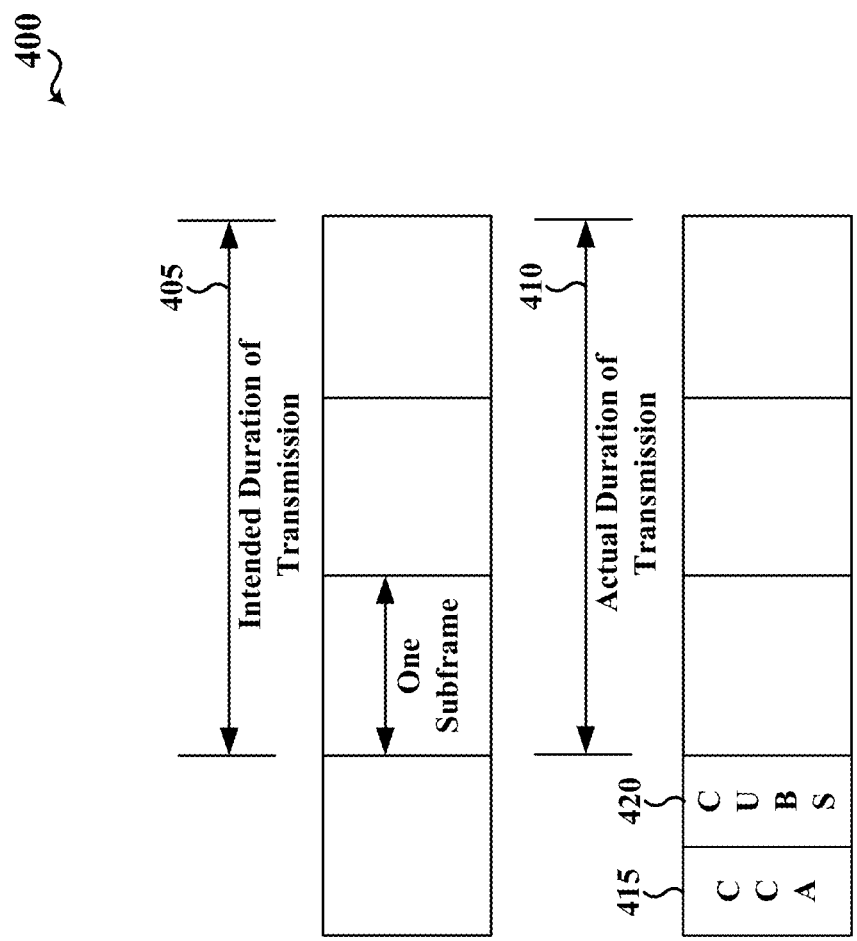
FIG. 4 shows an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the DL CCA procedure 345 or UL CCA procedure 365 described with reference to FIG. 3. The CCA procedure 415 may have a fixed duration. In some examples, the CCA procedure 415 may be performed in accordance with an LBT-frame based equipment (LBT-FBE) protocol. Following the CCA procedure 415, a channel reserving signal, such as a CUBS 420, may be transmitted, followed by a data transmission (e.g., an UL transmission or a DL transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
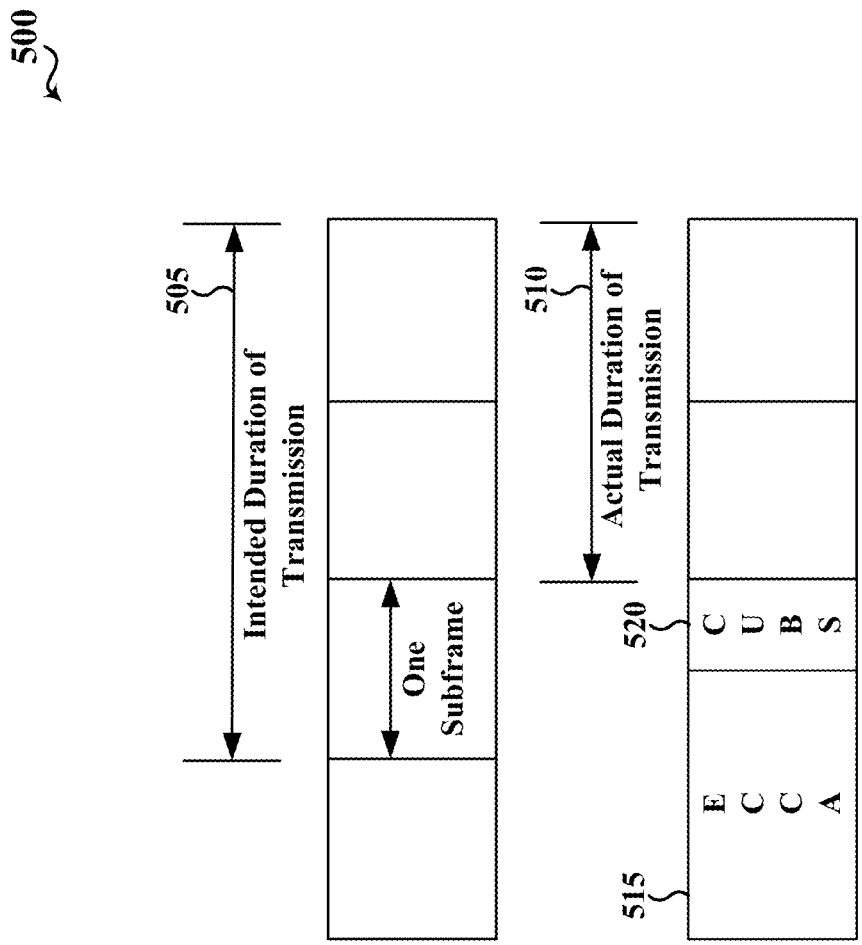
FIG. 5 shows an example of an eCCA procedure performed by a transmitting apparatus when contending for access to a contention-based shared radio frequency spectrum band, in accordance with various aspects of the present disclosure.

FIG. 5 is an illustration of an example 500 of an eCCA procedure 515 performed by a transmitting apparatus when contending for access to a contention-based shared radio frequency spectrum band, in accordance with various aspects of the present disclosure. In some examples, the eCCA procedure 515 may be an example of the DL CCA procedure 345 or UL CCA procedure 365 described with reference to FIG. 3. The eCCA procedure 515 may include a random number of CCA procedures, and in some examples may include a plurality of CCA procedures. The eCCA procedure 515 may, therefore, have a variable duration. In some examples, the eCCA procedure 515 may be performed in accordance with an LBT-load based equipment (LBT-LBE) protocol. The eCCA procedure 515 may provide a greater likelihood of winning contention to access the contention-based shared radio frequency spectrum band, but at a potential cost of a shorter data transmission. Following the eCCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
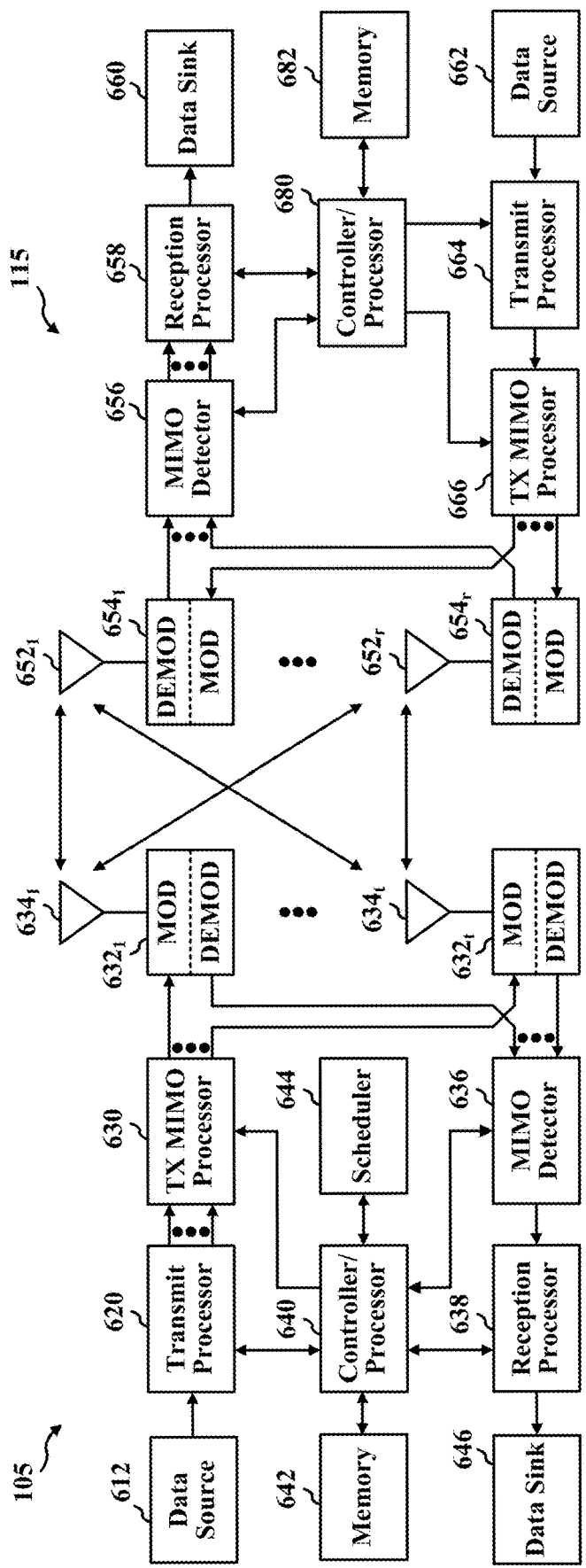
FIG. 6 shows a block diagram of a design of a base station/evolved Node B (eNB) and a UE, which may be one of the base stations/eNBs and one of the UEs in FIG. 1.

FIG. 6 shows a block diagram of a design of a base station 105, e.g., an eNB, and a UE 115, which may be one of the base stations/eNBs and one of the UEs in FIG. 1. The base station 105 may be equipped with antennas 634a through 634t, and the UE 115 may be equipped with antennas 652a through 652r. At the base station 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the base station 105 and may provide received signals to the demodulators (DE-MODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the PUSCH) from a data source 662 and control information (e.g., for the PUCCH) from the controller/processor 680. The transmit processor 664 may also generate reference symbols for a reference signal. The symbols from the transmit processor 664 may be precoded by a TX MIMO processor 666 if applicable, further processed by the demodulators 654*a* through 654*r* (e.g., for SC-FDM, etc.), and transmitted to the base station 105. At the base station 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the base station 105 and the UE 115, respectively. The controller/processor 640 and/or other processors and components at the base station 105 may perform or direct the execution of various processes for the techniques described herein. The controllers/processor 680 and/or other processors and components at the UE 115 may also perform or direct the execution of the functional blocks illustrated in FIGS. 12-17, and 20-22, and/or other processes for the techniques described herein. The memories 642 and 682 may store data and program codes for the base station 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, Wi-Fi, etc., for particular carrier frequencies, or both. For example, the device may use a fixed number of antennas for one carrier in CA cases, or it may use a fixed number of antennas for Wi-Fi when the device supports both Wi-Fi and other technologies, such as LTE. In one example, a UE may have four antennas and assign two of the antennas for Wi-Fi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

NB wireless communication involves unique challenges due to the limited frequency dimension of the narrow band. One example of such NB wireless communication is NB-IoT, which is limited to a single RB of system bandwidth, e.g., 180 kHz. Another example of NB wireless communication is eMTC, which is limited to six RBs of system bandwidth. The NB communication may be deployed in a "standalone" system, e.g., in a dedicated spectrum. Multiple users may utilize the narrow band. While only some of the UEs may be active at a particular time, the NB communication should support such multi-user capacity.

Additionally, NB communication may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources.

NB-IoT communication may also involve a large cell radius, e.g., as much as approximately 35 km. Thus, the communication may involve a long delay, such as 200 μs, which may employ a long Cyclic Prefix (CP) length.

Similar challenges are involved with NB communication using eMTC, e.g., with Category 0, low cost MTC UEs. An MTC UE may be implemented with reduced peak data rates (e.g., a maximum of 1000 bits for a transport block size). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond.

MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB.

In eMTC with extended coverage support, one or more channels may be bundled (e.g., repeated) in the time domain. In particular, bundled M-PDCCH may use multiple subframes for transmission. Resources for an M-PDCCH may be allocated by an eNB in accordance with requirements for ePDCCH within the narrowband on which an MTC UE is operating.

Aspects presented herein provide for wireless communication between base station and UEs having different bandwidths. The communication may comprise IoT communication, e.g., NB-IoT, eMTC, etc. The aspects may enable such wireless communication between base stations and UEs having different bandwidths while operating in the unlicensed or shared spectrum.

There are a number of regulations regarding wireless communication in the unlicensed spectrum. These regulations may vary by country.

For example, in the United States, there may be regulations regarding the frequency for unlicensed wireless communication, e.g., between 2400-2483.5 MHz. Digital modulation for such unlicensed wireless communication may include bandwidth limitations, transmission power limitations, etc. For example, wireless communication on the unlicensed spectrum may be subject to a 500 KHz minimum bandwidth, 30 dBm of maximum transmission power, 36 dBm maximum Effective Isotropic Radiated Power (EIRP), a maximum transmit Power Spectral Density (PSD) of 8 dBm/3 KHz. For digital modulation operation, there may be no dwell time limits.

There may also be additional regulations regarding frequency hopping operation. For example, in the United States, frequency hopping in the unlicensed spectrum is allowed for hopping channels having a maximum of 25 kHz and 20 dB bandwidth. In one example, when output power is less than or equal to 21 dBm, the maximum may be 25 kHz and ⅔*20 dB bandwidth. The hopping may be required to comprise a pseudo randomly determined frequency and uniform occupancy for each channel over one full hopping cycle. Thus, while a pattern may be used, the pattern may be required to be pseudo random. Receivers may have input bandwidths that match the hopping channel bandwidths of transmitters and may shift frequencies in synchronization with the transmitted channels. The structure or regulations may vary depending on the number of channels used for frequency hopping. For example, for frequency hopping using at least 15 channels, the maximum dwell time may be 0.4 seconds. This may avoid transmissions on a certain channel provided that a minimum of 15 channels are used for the frequency hopping. If at least 75 channels are used, then the maximum transmission power may be 30 dBm. If less than 75 channels are used, the maximum transmission power may be 21 dBm. Intelligent hopping may be performed, e.g., allowing the avoidance of some channels per device. However, coordination among multiple devices may not be allowed.

A hybrid system may employ a combination of both frequency hopping and digital modulation techniques. Such a hybrid system may comprise a maximum transmit Power Spectral Density (PSD) of 8 dBm/3 KHz. As well, the frequency hopping operation of the hybrid system may have a dwell time limit of 0.4 seconds per channel. Thus, the occupancy on any frequency may be regulated to not exceed 0.4 seconds. The number of hopping channels might not be limited.

In Europe, there are regulations for non-adaptive frequency hopping and for adaptive frequency hopping.

For non-adaptive frequency hopping, there is a maximum transmission power of 20 dBm and a 100 kHz minimum hopping bandwidth. For example, Medium Utilization (MU) may be limited to less than 10% where MU=(P/100 mW)*DC. P is a transmission power. DC is a duty cycle, which may be declared by the manufacturer based on observations over maximum dwell periods.

In Europe, there may be a 5 ms maximum on time and a requirement for at least a 5 ms gap between transmissions.

There may also be a 15 ms dwell time on a given frequency in 15*N ms. In a first option, each hopping frequency in the hop set may be occupied at least one in a period of 4N*dwell time. In a second option, the occupation probability of each frequency may be limited to between 25% of 1/N and 77% of 1/N. N is a number of hopping frequencies used.

An occupied channel bandwidth may be regulated to contain 99% of the power of the transmission. If the EIRP is more than 10 dBm, then a nominal channel bandwidth may be less than or equal to 5 MHz.

Equipment may transmit on at least one hopping frequency while other hopping frequencies are blacklisted. Blacklisted frequencies are considered as active for computing MU. Equipment may be required to occupy that frequency for the duration of the dwell time.

For adaptive frequency hopping, there may be a 20 dBm maximum transmit power, a 0.4 s dwell time within 0.4 s*N, where N is greater than max(15, 15 BW(MHz)). A 100 kHz minimum hopping bandwidth may operate over 70% of the band. MU may be the same as for non-adaptive frequency hopping. A minimum frequency occupation may be 1 dwell time (DWT) within a period not exceeding 4*DWT*N. The transmission may be on at least two frequencies.

At least one of two Detect And Avoid (DAA) methods may be employed. Listen Before Transmit (LBT) is one example of a DAA method. For LBT based DAA, a CCA may be based on a 0.2% observation period at the start of a dwell time with a minimum of 20 µs. When a signal is above an Energy Detect (ED) level, then the frequency may be skipped and is not counted toward the 15 channel requirement. If the channel is not skipped, then, the device may wait without transmitting. As another option, the device may perform eCCA with 1 to 5% of a channel occupancy time. The channel occupancy time may be 60 ms followed by an idle period of a maximum (5%, 100 µs), which means 5% of channel occupancy time (e.g., 3 ms for 60 ms) or 100 µs, whichever is the largest. When using LBT based DAA, if a signal is detected, a jump may be made to the next frequency in the hopping sequence provided the time for a maximum dwell time is respected.

Another DAA method may involve evaluating channels for signal presence and avoiding those frequencies for a maximum of (1 sec, 5*N*COT) when the channel is found to be busy, where COT is a channel occupancy time. A maximum COT may be 40 ms, and an idle period may have a maximum of (5% of COT, 100 µs) after a COT.

For wideband modulation, there may be a 20 dBm maximum transmission power, a maximum transmit PSD of 10 dBm/MHz, and a maximum bandwidth of 20 MHz. A transmission sequence may be less than 10 ms with a minimum transmission gap=max(upcoming transmission sequence, 3.5 ms). MU may be similar to the unlicensed spectrum. (MU) may be limited to less than 10% where MU=(P/100 mW)*DC. LBT and non LBT DAA may be employed.

Other countries may have different regulations regarding wireless communication in the unlicensed spectrum.

Base Station and UE with Different Bandwidths

Aspects presented herein enable wireless communication in the unlicensed spectrum between a base station and a UE having different bandwidths. Table 1 illustrates a table of examples of possible bandwidth combinations between eNBs and UEs in the unlicensed spectrum.

TABLE 1

| eNB bandwidth (MHz) | UE bandwidth (MHz) | Comments |
|---|---|---|
| 1.4, 5, 10, 20 | 1.4 | Adaptation of eMTC design |
| 10, 20 | 5 | Wideband UE capability |
| 5 | 5 | Coverage extension based on MF 1.0 FS3 design (UL waveform may be different) |
| 10 | 10 | |
| 20 | 20 | |

In one example, the base station may be a wideband eNB, or other base station, capable of wideband communication, and the UE may be a NB UE. For example the UE may have a bandwidth of 1.08 MHz. The eNB may be base station 105, 105-a, 105-b and the UE may be UE 115, 115-a, 115-b.

Figure 7:
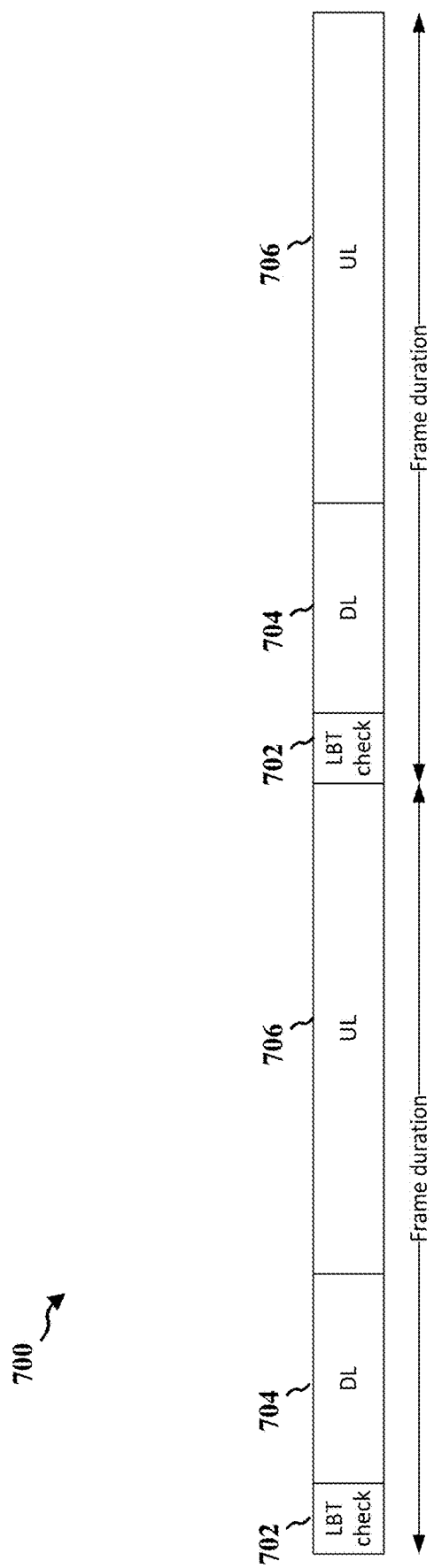
FIG. 7 illustrates an example frame structure in accordance with aspects presented herein.

The eNB may perform a LBT operation before transmitting, while the UE may transmit to the eNB without performing an LBT operation. FIGS. 4 and 5 illustrate example aspects of example LBT operations. FIG. 7 illustrates an example frame structure 700 for communication between a wideband eNB and a NB UE. As illustrated, at the start of each frame, the eNB may perform an LBT 702. The eNB may then transmit for the duration of the frame. The duration of the LBT portion 702 of the frame, the Uplink (UL) portion 706 of the frame, and the downlink (DL) portion 704 of the frame may be configurable by the eNB.

A 20 MHz eNB may be deployed using a digital modulation mode or a hybrid mode. An eNB of up to 5 MHz may be deployed using a frequency hopping mode. Thus, in one example, the eNB may have a 5 MHz bandwidth and the UE may have a 1.4 MHz bandwidth.

In one example, the frame structure 700 of FIG. 7 may have a duration of 40 ms. In this example, up to 10 frames may be transmitted on each hopping frequency, e.g., for a maximum dwell period of 400 ms on a frequency. The number of the frames may be a function of the bandwidth supported by the eNB, e.g., as the number of narrow bands in a given bandwidth over which the UE hops is a function of the eNB bandwidth.

As the duration of the LBT 702, DL portion 704, and UL portion 706 may be configured by the eNB, for the 40 ms frame, the DL duration may be 8 ms, the UL duration may be 30 ms, and the LBT duration may be 2 ms for UL heavy communication. For DL heavy communication, the DL duration may be 28 ms, the UL duration may be 10 ms, and the LBT duration may be 2 ms.

An idle period of 5% may be important, e.g., to satisfy regulatory requirements. In order to achieve this idle period, the UL duration 706 of the frame may be applied toward the idle period. Thus, when there are 2 UL subframes in a frame duration, the idle period for the eNB may be met.

The initial CCA requirements for the LBT operation at 702 may have an observation period of at least 40 ms*0.002. In the example of a 40 ms frame, the CCA observation period may be 80 μs. However, in another example, at least 200 μs channel observation period may be used to cover a 2 symbol retuning gap used in eMTC applications by UEs.

Figure 8:
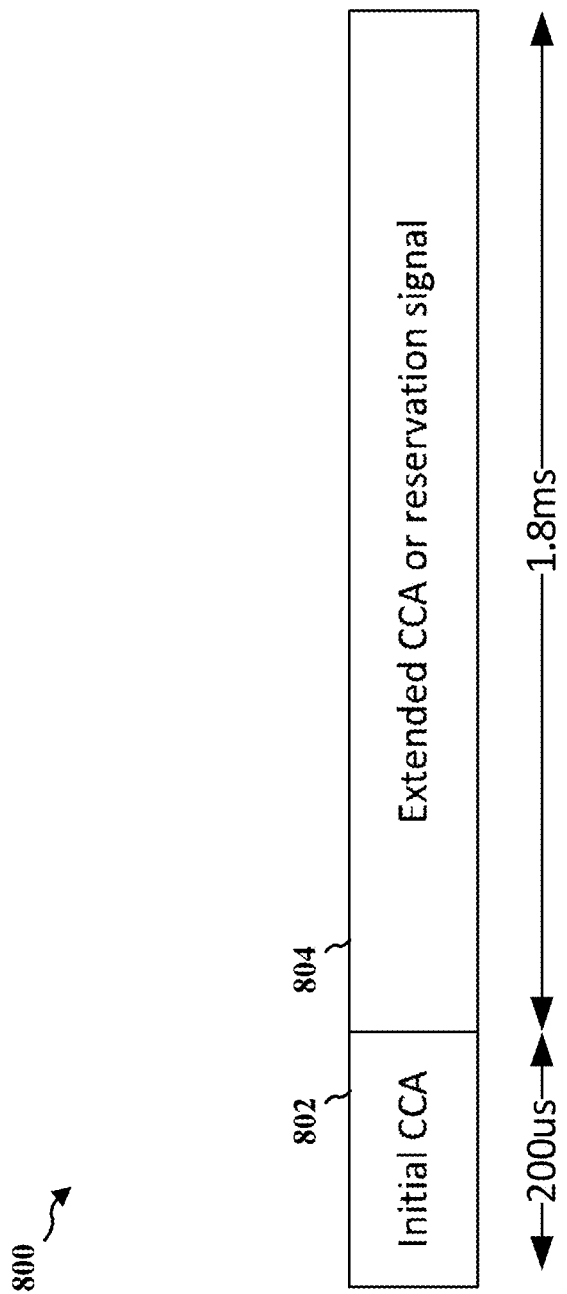
FIG. 8 illustrates an example CCA/eCCA structure in accordance with aspects presented herein.

The LBT procedure may comprise performing CCA or eCCA, as described in connection with FIGS. 4 and 5. FIG. 8 illustrates frame structure 800 having an example duration for an initial CCA 802 and an extended CCA 804.

If an base station transmitted on a previous frame or if the present frame is the first frame on a frequency, the base station may attempt an initial CCA 802 in the first 200 μs of the frame. If the initial CCA 802 is successful, the base station may transmit a reservation signal for 1.8 ms and then may start frame transmission, e.g., 704, 706. If the base station did not transmit on the previous frame on a frequency, the base station may wait until the CCA location for the next frame boundary and may try eCCA again.

If the initial CCA 802 fails, the base station may begin performing eCCA for a duration between, e.g., 400 μs to 1.8 ms. If eCCA is unsuccessful, the base station may wait until the CCA location for the next frame boundary and may try eCCA again.

The total base station transmission time may be 1.8 ms/0.05=36 ms. Thus, the maximum DL duration 704 may be 36 ms, and a minimum UL duration 706 may be 4 ms for each frame. The 4 ms minimum UL provides a base station idle period.

Figure 9:
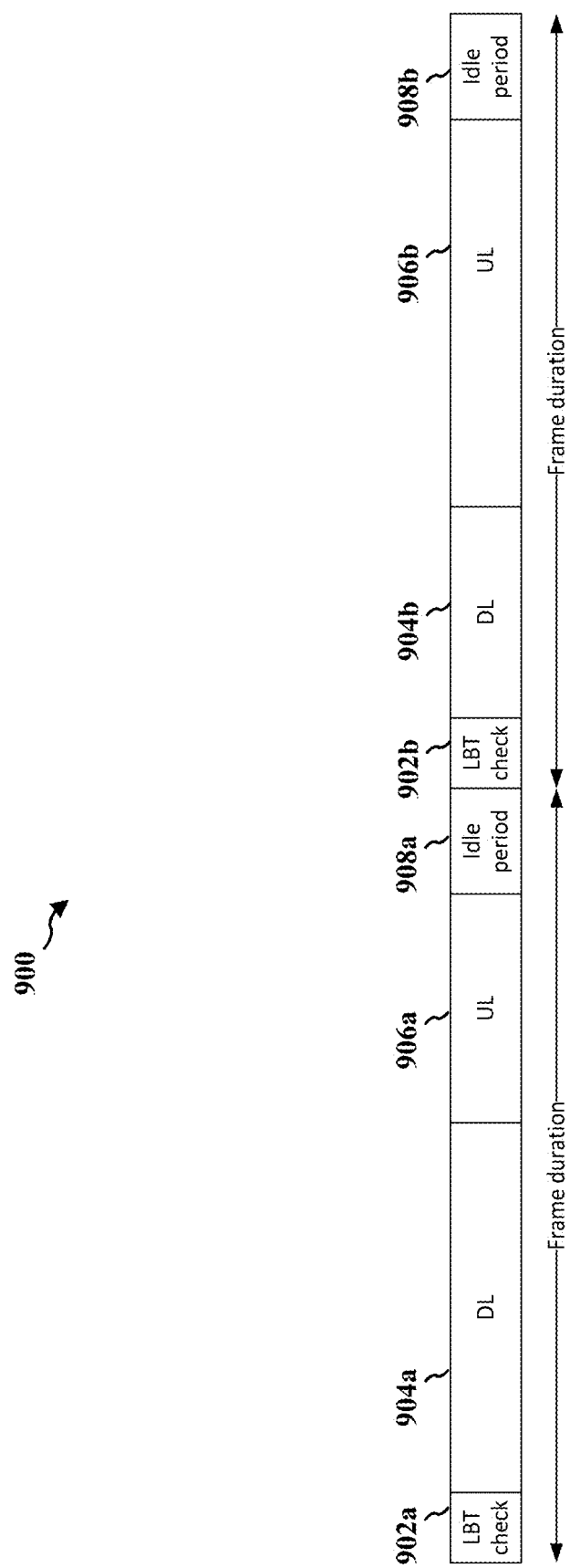
FIG. 9 illustrates an example frame structure in accordance with aspects presented herein.

A frame structure may be different in the first frame or in a number of initial frames on a given hopping frequency. For example, there may be a minimum number of subframes in each burst that can function as anchor DL subframes that are always present when the base station wins medium access via CCA/eCCA. FIG. 9 illustrates an example frame structure 900 having DL portions 904a, 904b of different durations and UL portions 906a, 906b of different durations. Although LBT portions 902a, 902b may be configured differently for different frames, in FIG. 9, the LBT portions 90sa, 902b are the same. Similarly, idle periods 908a, 908b are illustrated as having the same duration.

Therefore, the base station has the ability to configure the DL duration 904, 904b and the UL duration 906a, 906b based on the information to be communicated. For example, DL heavy frames may carry more DL and UL grants or network signaling messages such as paging and System Information Blocks (SIBs).

Concentrating base station transmissions, e.g., in DL portion 904a, has the potential to reduce UE power consumption by reducing the amount of time the UE monitors the medium. Channel estimation gains may also be achieved due to a longer transmission on a single frequency or due to a transmission without gaps.

In one example, the DL-UL ratio in each of the frames can be configurable on a long term basis. The DL-UL ratio may be signaled, e.g., by RRC signaling or through an indication in a SIB.

Allowed frame structures may be defined, stored in a table, etc. The base station may then signal the adopted frame structure to the UE. For example, the base station may signal the adopted frame structure to the UE using a SIB. This would enable the base station to change the frame structure after each SIB modification period.

As discussed above, the UE may transmit UL communication during UL duration, e.g., 706, 906a, 906b without performing an LBT. Thus, the UE may transmit to the base station when it receives a grant from the base station, e.g., in DL duration 704, 904a, 904b. A base station transmission is detectable to all UEs common signals, e.g., PSS/SSS. However, UE transmission detection at the base station may consume significant amounts of overhead. By removing the requirement for the UE to perform LBT, this overhead may be reduced. Transmitting UL communication from the UE to the base station also reduces power consumption at the UE due to the simpler overall operation. Regulations may impose stricter constraints on transmission characteristics for transmissions sent without LBT.

For example, European regulations may require a 5 ms on time to be followed by a 5 ms off time. The on time is cumulative on any frequency. There may be a 15 ms maximum dwell time on any given frequency in 4*15*N ms, where N is a number of the hopping frequencies.

Figure 10:
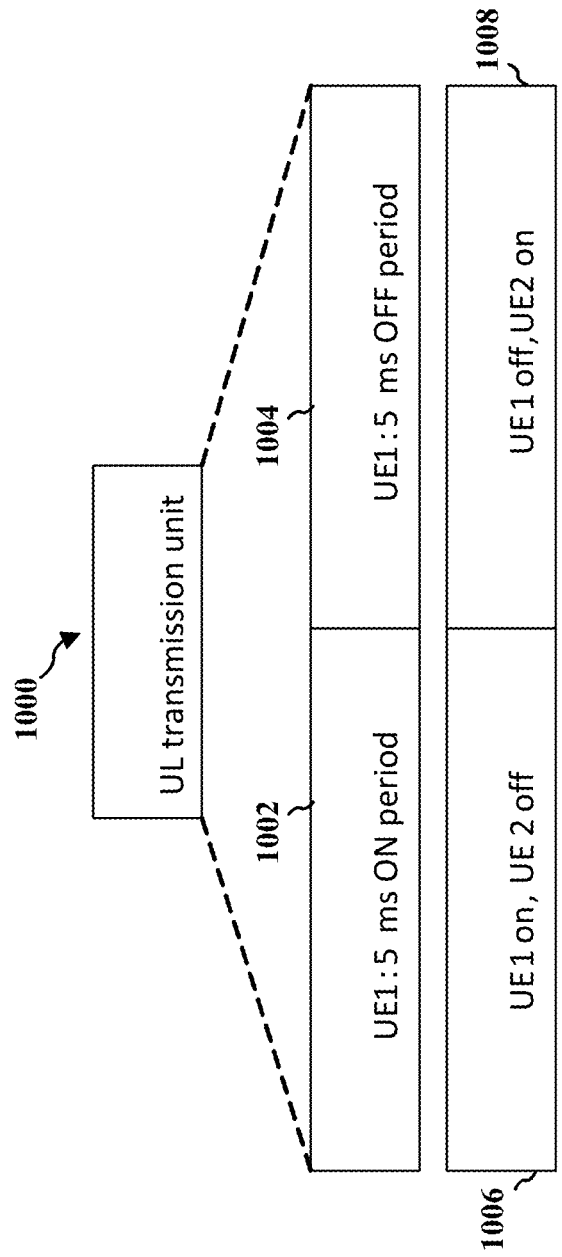
FIG. 10 illustrates an example transmission unit structure in accordance with aspects presented herein.

Therefore, the UE may use a frame structure that comprises a transmission unit having a 5 ms on period and a 5 ms off period. This enables a UE to meet regulatory compliance by design. This modular structure of transmission units allows changes when off periods are not needed in a region. FIG. 10 illustrates an example UL transmission unit 1000 having a first portion comprising a 5 ms ON period 1002 followed by a second portion comprising a 5 ms OFF period 1004. The UL duration, e.g., 706, 906a, 906b may be divided into multiple transmission units 1000. Each frame may comprise 1, 2, or 3 UL transmission units 1000, e.g., 10 ms, 20 ms, or 30 ms of UL transmissions depending on the configuration selected by the base station, or based on a specification. This can simplify the signaling aspects and the UE procedures as an integer number of UL transmission units may be contained in a frame. In order to efficiently use the capacity of the wideband base station, different UEs may be multiplexed in each transmission unit.

FIG. 10 illustrates an example in which the transmission unit for a second UE (UE 2) may be configured opposite that of the first UE (UE 1). For example in the first 5 ms, the transmission unit for UE1 has an ON period 1002 while UE 2 has an OFF period 1006. Similarly the second 5 ms of the transmission unit 1000 is an OFF period for UE 1 1004 and an ON period for UE 2 1008. Thus, the ON/OFF portions of transmission units for different UEs may be interleaved in order to make efficient use of the resources at the base station.

Aspects may include UL data channel bundling for the UE. For example, a same redundancy version (RV) and scrambling sequence may be applied to DMRS and PUSCH during the 5 ms period in each transmission unit for the UE.

For UL PUSCH scheduling, when the UE needs less than 5 subframes, PUSCH may be scheduled within one transmission unit, e.g., 1000. As illustrated in FIG. 10, other UEs may be multiplexed on the remaining resources, e.g., during OFF period 1004, etc. When the UE needs more than 5 subframes for its UL transmission, the base station may schedule PUSCH for the UE in multiples of transmission units 1000. The UL start delay may also be specified from the base station to the UE in terms of transmission units 1000.

Figure 11:
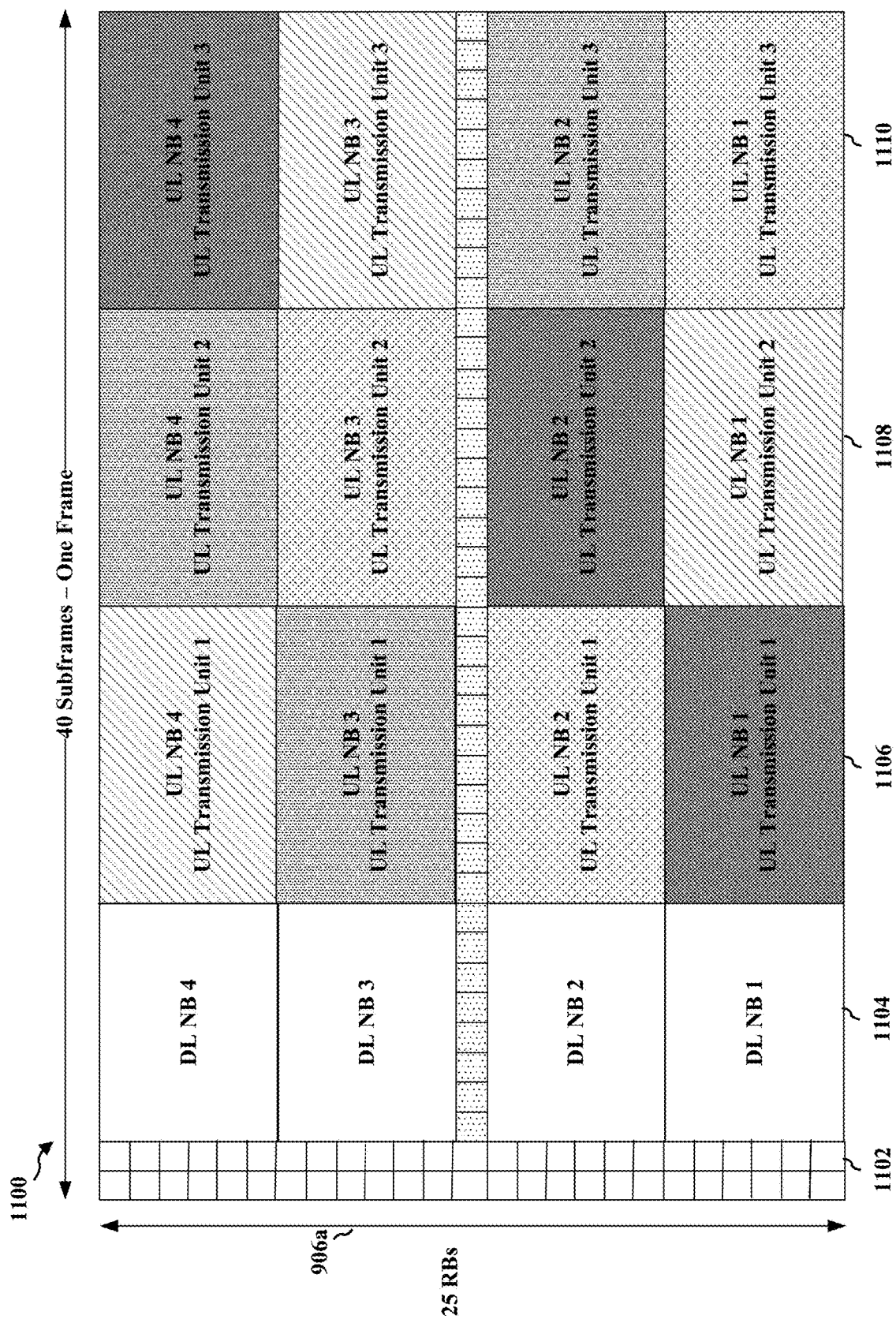
FIG. 11 illustrates an example frame structure in accordance with aspects presented herein.

FIG. 11 illustrates an example frame structure 1100 for narrowband UEs (e.g., 115, 115-*a*, 115-*b*, 1350, 1902, 1902', 2250) to hop within a channel occupancy of a wideband base station (e.g., 105, 105-*a*, 105-*b*, 1950, 2202, 2202'). The frame structure 1100 includes an LBT portion 1102 at the beginning of the frame during which the base station may perform CCA/eCCA. LBT portion 1102 may correspond to LBT duration 702, 902*a*, 902*b*. The frame structure 1100 includes a DL portion 1104 and an UL portion comprising three transmission units 1106, 1108, 1110. DL portion 1104 may correspond to DL duration 704, 904*a*, 904*b*. The UL portion composed of transmission units 1106, 1108, 1110 may correspond to UL duration 706, 906*a*, 906*b*.

The frame structure 1100 comprises multiple NB channels, e.g., NB 1, NB2, NB3, NB4. As described in the present application, the base station may be capable of transmitting or receiving across a wider bandwidth than the UEs with which the base station communicates. For example, the UEs might each only be able to transmit or receive on a single NB channel, whereas the base station is capable of transmission and reception across multiple NB channels.

NB UEs may use an UL frequency hopping pattern within a wideband base station's channel occupancy. In a first example, the UE may transmit UL transmissions to the base station using frequency hopping across transmission units within a frame, as in FIG. 11. FIG. 11 illustrates an example for a 25 RB eNB and for 5 MHz. In the example in FIG. 1, a first UE transmits UL transmission in NB1 for transmission unit 1, in NB2 for transmission unit 2, and in NB4 for transmission unit 4. Thus, the UE hops NB frequency channels within the base station bandwidth for the base station's channel occupancy during the frame. After the frame, the UE may jump to a different frequency in accordance with a corresponding frequency hop by the base station. In another example, the UE may transmit UL transmissions to the base station using frequency hopping across frames with the same NB being used within each frame. For example, the UE may transmit a maximum of 3UL transmission units in a given NB channel before it moves to a new NB channel.

The UE may perform two level frequency hopping among NB channels. First, the UE may hop within the base station's NB channels using a hop frequency with a fixed pattern, e.g., similar to the hopping pattern of FIG. 11. Second, the base station and the UE may hop across the whole unlicensed frequency band, e.g., in accordance with any regulatory requirements on hopping.

A number of frames per frequency before performing the second hop in which the base station and the UE hop to a new frequency may be a function of the number of DL subframes in the frame structure and the number of narrow bands on which the UE can hop within the base station's channel occupancy.

A number of narrow bands may be defined for IoT, e.g., NB-IoT and/or eMTC. For example, for eMTC bandwidths 5, MHz, 10 MHz, and 20 MHz results in 4 narrow bands, 8 narrow bands, and 16 narrow bands, respectively, over which the UE can hop within the base station's channel occupancy. FIG. 11 illustrates 4 narrow bands on which the UE may hop. In eMTC, only two narrow bands may be provided for all channels, and up to 4 channels may be for PDCCH/PDSCH only.

In a first example, for a 5 MHz base station bandwidth, 4 frames per frequency is 160 ms, which corresponds to 12 UL transmission units per hop frequency across all frames. The UE may use 3 transmission units per narrowband for a total of 12 transmission units across the 4 frames.

In a second example, for a base station having a 10 MHz bandwidth, 8 frames per frequency is 320 ms, which corresponds to 24 UL transmission units per hop frequency across all frames. The UE may use 3 transmission units per narrowband for a total of 24 transmission units across the 8 frames.

A wideband base station provides higher capacity at a single base station to serve multiple UEs at the same time. This reduces the number of base stations that need to be deployed, and therefore, reduces the cost needed to serve a given number of users. A wideband base station also enables a higher dwell time per NB channel, because the UEs may hop in-band with the base station bandwidth occupancy. Through the use of different hopping patterns at different base stations allows a network to avoid interference from transmissions in other cells. For example, N hopping frequencies used by the base station implies that N different base stations within an area can coexist without any interference in a controlled environment. The choice of N may depend on regulations or the bandwidth chosen by the base station. The choice of N may also be based on the minimum number of frequencies that the UE needs to transmit. While different DL/UL configurations may be used for each base station in a frame, interference may be avoided from nearby base stations using hopping. This enables different base stations to have different DL-UL configurations in each frame without any mixed interference scenarios.

As illustrated in FIGS. 7. 9, and 11, DL transmissions from the base station may each be gated with an LBT at the beginning of the frame. This may impact MPDCCH repetitions. For a small number of repetitions, the MPDCCH may be transmitted in one frame. For a larger number of repetitions, MPDCCH may span multiple frames, each frame having an independent LBT. It may be simpler for the base station to transmit all the repetitions of the DL grants within one frame. Some DL heaving frames, e.g., similar to 904a, may be sufficient to enable this option without an impact on the coverage. In a different example, when MPDCCH spans multiple frames, then the MPDCCH may either be gated by an LBT, or may be postponed, e.g., until a next frame sent by the base station. For both options, the UE needs to be able to accurately determine whether the base station is transmitting so that it can soft-combine the information across frames. A postponed MPDCCH may affect other UE scheduling as UEs may only be awake during a discontinuous reception (DRX) on period.

Similarly, MPDSCH transmissions may span multiple frames. If the UE receives a DL grant from the base station, then the base station has similar option to either postpone the MPDSCH transmission or to gate the MPDSCH transmission with an LBT procedure.

The selection between gating or postponing the MPDCCH or MPDSCH may be made dynamically by the base station or may be based on a specification. For example, the base station may dynamically select whether to gate or postpone the MPDCCH or MPDSCH based on the interference environment, based on a likelihood of the UE missing the transmission from the base station, and/or a likelihood of the UE falsely detecting a non-existing base station transmission. The dynamic selection may be based on how reliably the UE may detect whether the base station transmission is on or off.

In contrast, LBT may not have a major impact on UL transmissions such as MPUCCH or MPUSCH. The UE may transmit to the base station without performing an LBT operation. The UE may transmit MPUCCH and MPUSCH in a frame even if the base station did not transmit during the DL subframes. For MPRACH, when resources are allocated by a cell-specific configuration, the UE may attempt RACH transmissions at a designated time, e.g., without LBT.

Figure 12:
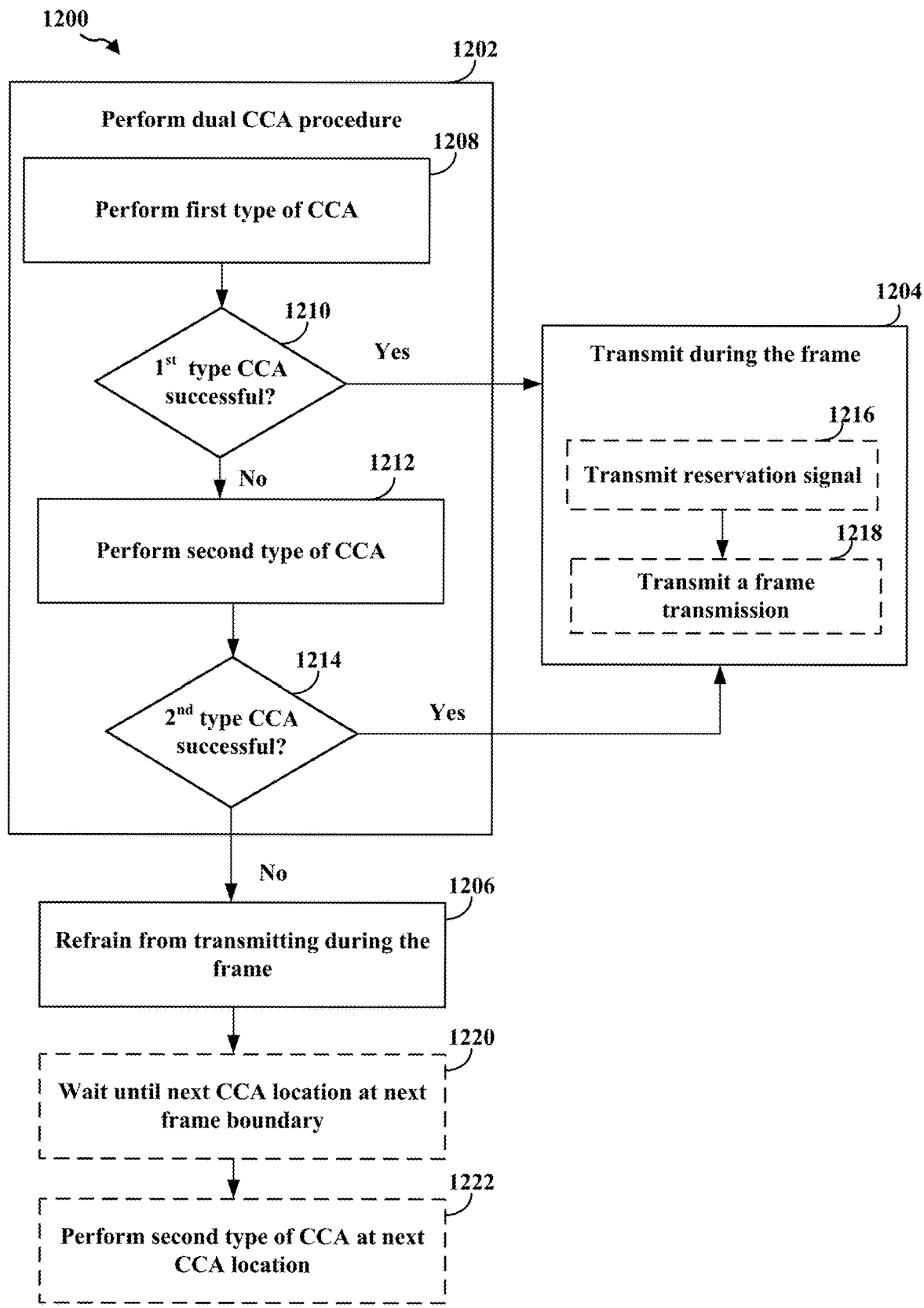
FIG. 12 is a flowchart of a method of wireless communication at a base station.

FIG. 12 is a flowchart 1200 of a method of wireless communication. The method may be performed by a base station (e.g., the base station 105, 105-a, 105-b, the apparatus 1302/1302') communicating wirelessly with a UE (e.g., UE 115, 115-a, 115-b, 1350). Optional aspects in FIG. 12 are illustrated using a dashed line. The wireless communication may comprise eMTC in an unlicensed or shared spectrum. The base station may perform an LBT operation at a beginning of a frame, prior to transmitting downlink communication to the UE, e.g., as described in connection with FIGS. 4, 5, and 8. The base station may transmits a downlink communication to a UE on an unlicensed spectrum using a first bandwidth and may receive uplink communication from a UE using a second, narrower bandwidth, e.g., as described in connection with FIGS. 7, 9, and 11. Thus, base station may communicate with a narrow band UE using a narrow band and may also be capable of communicating as a wide band base station.

As illustrated in FIG. 12, at 1202, the base station performs a dual CCA procedure for a frame. The dual CCA procedure at 1202 may be performed when the base station transmitted on a previous frame or prior to the base station transmitting the frame as a first frame on a frequency, e.g., as described in connection with FIG. 8. The dual CCA procedure may comprise a first type of CCA procedure followed by a second type of CCA procedure when the first type of CCA procedure is unsuccessful. Thus, at 1208, the base station may perform a first type of CCA procedure. At 1210, the base station may determine whether the first type of CCA procedure was successful. If not, at 1214, the base station may perform a second type of CCA procedure.

At 1204, the base station may transmit during the frame when at least one CCA procedure of the dual CCA procedure is successful. At 1206, the base station may refrain from transmitting during the frame when both CCA procedures of the dual CCA procedure are unsuccessful.

The first type of CCA procedure may comprise CCA and the second type of CCA procedure may comprise eCCA. Thus, at 1208, the base station may perform CCA for a first period of time and may perform eCCA for a second period of time at 1212 when the CCA at 1210 is unsuccessful. The second period of time, e.g., for performing eCCA, may be longer than the first period of time, e.g., for performing CCA.

When CCA is determined to be successful at 1210, the base station may transmit a reservation signal, at 1216, and may transmit a frame transmission, at 1218, following the reservation signal. Similarly, when CCA is unsuccessful, yet eCCA is determined to be successful at 1214, the base station may transmit a reservation signal, at 1216, and may transmit a frame transmission, at 1218, following the reservation signal. When the eCCA is successful, the reservation signal length is based on the time from the successful eCCA to the frame boundary. Then, the frame transmission starts. Thus, the reservation signal fills the gap between the eCCA and the frame boundary.

When neither CCA nor eCCA is successful, the base station may, at 1220, wait until a next CCA location at a next frame boundary. Then, at 1222, the base station may perform the second type of CCA procedure, e.g., eCCA, at the next CCA location.

A first transmission time corresponding to the first type of CCA procedure at 1208 may be independent of a first duration of the first type CCA and a second transmission time corresponding to the second CCA procedure at 1212 may be based on a second duration of the second type CCA. Thus, the transmission time for CCA may be independent of the CCA duration while for eCCA, the transmission time is a function of the eCCA duration. The eCCA duration can be smaller if the downlink transmission time is smaller. To align the start transmission times for different frame structures, each of which have a different downlink duration, a variable length of reservation signal time may be applied. Alternatively, the eCCA may be started later so that the end of the eCCA coincides with the subframe boundary where data transmission starts.

The base station may receive UL communication from the UE without an LBT operation from the UE. Thus, the frame may comprise an LBT portion, e.g., 702, 902a, 902b, a DL portion, e.g., 704, 904a, 904b; and an UL portion, e.g., 706, 906a, 906b. The eNB may transmit downlink communication or receive uplink communication for the duration of a frame after performing the LBT operation, as illustrated in FIG. 7. The LBT operation duration, a downlink duration, and an uplink duration of the frame may be configurable by the eNB. In order to configure these durations, the eNB may select a frame structure having a defined downlink duration and a defined uplink duration. The eNB may then signal the selected frame structure to the UE.

Figure 13:
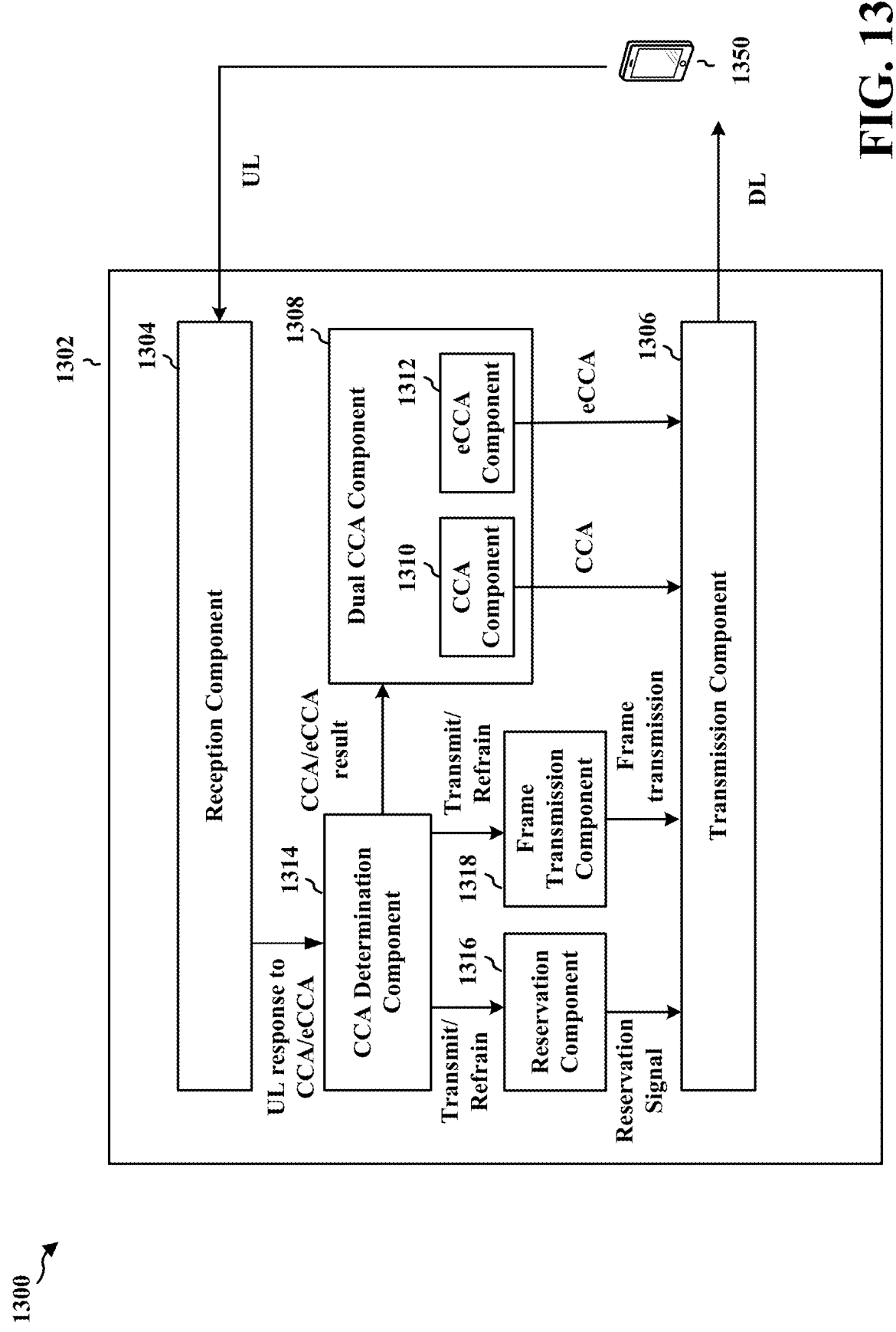
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station (e.g., e.g., the base station 105, 105-a, 105-b). The apparatus includes a reception component 1304 configured to receive uplink communication from at least one UE 1350, and a transmission component 1306 configured to transmit DL communication to the at least one UE 1350. The wireless communication may comprise eMTC in an unlicensed or shared spectrum.

The apparatus may include a dual CCA component 1308 configured to perform a dual clear CCA procedure for a frame, wherein the dual CCA procedure comprises a first type of CCA procedure, e.g., CCA, followed by a second type of CCA procedure, e.g., eCCA, when the first type of CCA procedure is unsuccessful. Thus, the dual CCA component 1308 may include a CCA component 1310 and an eCCA component 1312. The apparatus may include a CCA determination component 1314 configured to determine whether the first type of CCA procedure and/or the second type of CCA procedure was successful. When one of the types of CCA procedures was successful, the CCA determination component 1314 may be configured to indicate to a transmission component (e.g., any of 1306, 1316, or 1318) to transmit during the frame. When both CCA procedures of the dual CCA procedure are unsuccessful the CCA determination component 1314 may indicate to refrain from transmitting during the frame. The apparatus may include a reservation component 1316 configured to transmit a reservation signal when one of the CCA procedures is successful and a frame transmission component 1318 configured to transmit a frame transmission following the reservation signal. When both CCA and eCCA are unsuccessful, the CCA determination component may configured to cause the apparatus to wait until a next CCA location at a next frame boundary and to perform eCCA at the next CCA location.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
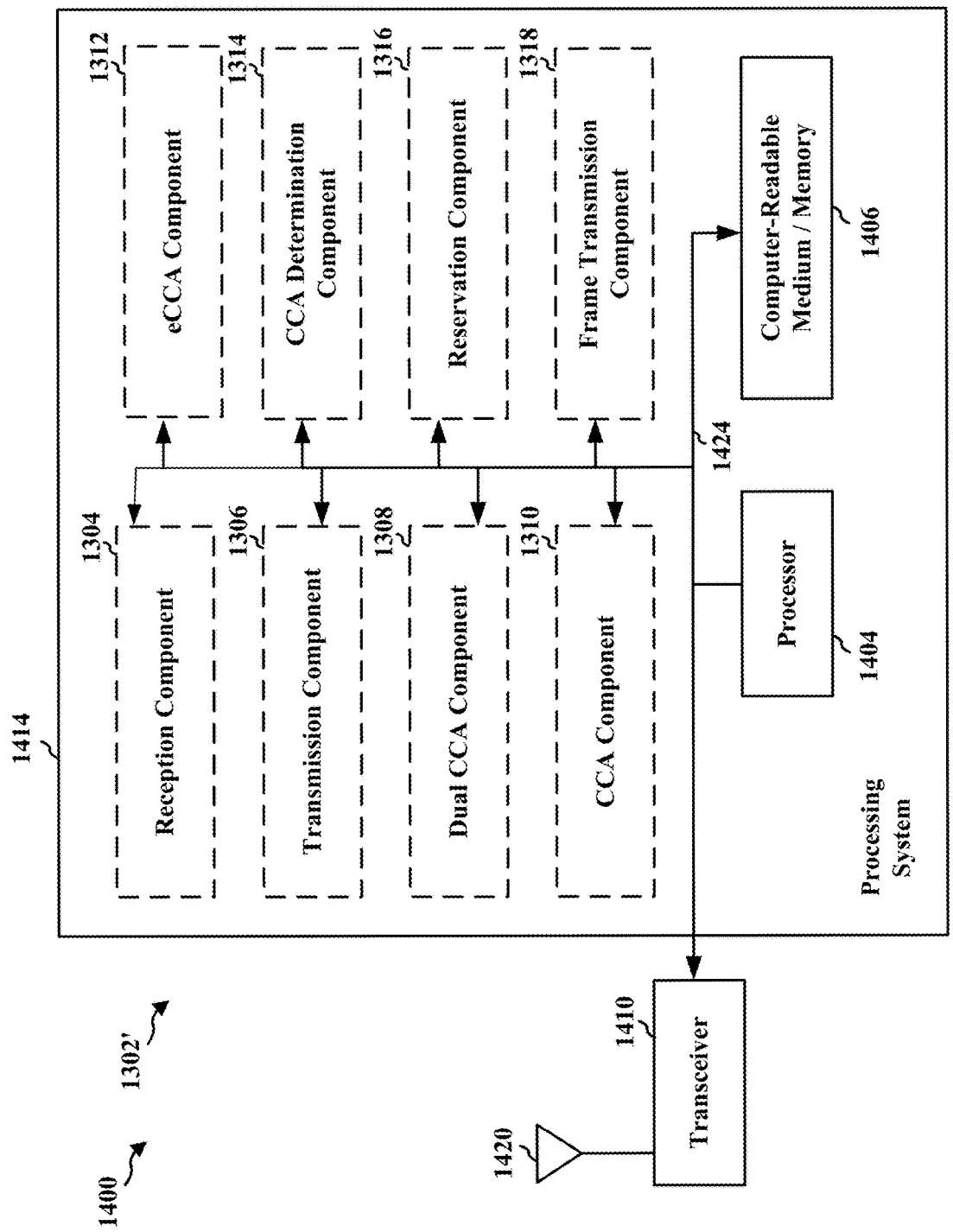
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318. The components may be software components running in the processor 1404, resident/stored in the computer readable medium/memory 1406, one or more hardware components coupled to the processor 1404, or some combination thereof. The processing system 1414 may be a component of the base station 105 and may include the memory 642 and/or at least one of the TX processor 620, the RX processor 638, and the controller/processor 640.

In one configuration, the apparatus 1302/1302' for wireless communication includes means for performing a dual clear channel assessment (CCA) procedure for a frame, means for transmitting, means for refraining from transmitting, means for transmitting a reservation signal when the CCA/eCCA is successful, and means for transmitting a frame transmission following the reservation signal. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Figure 15:
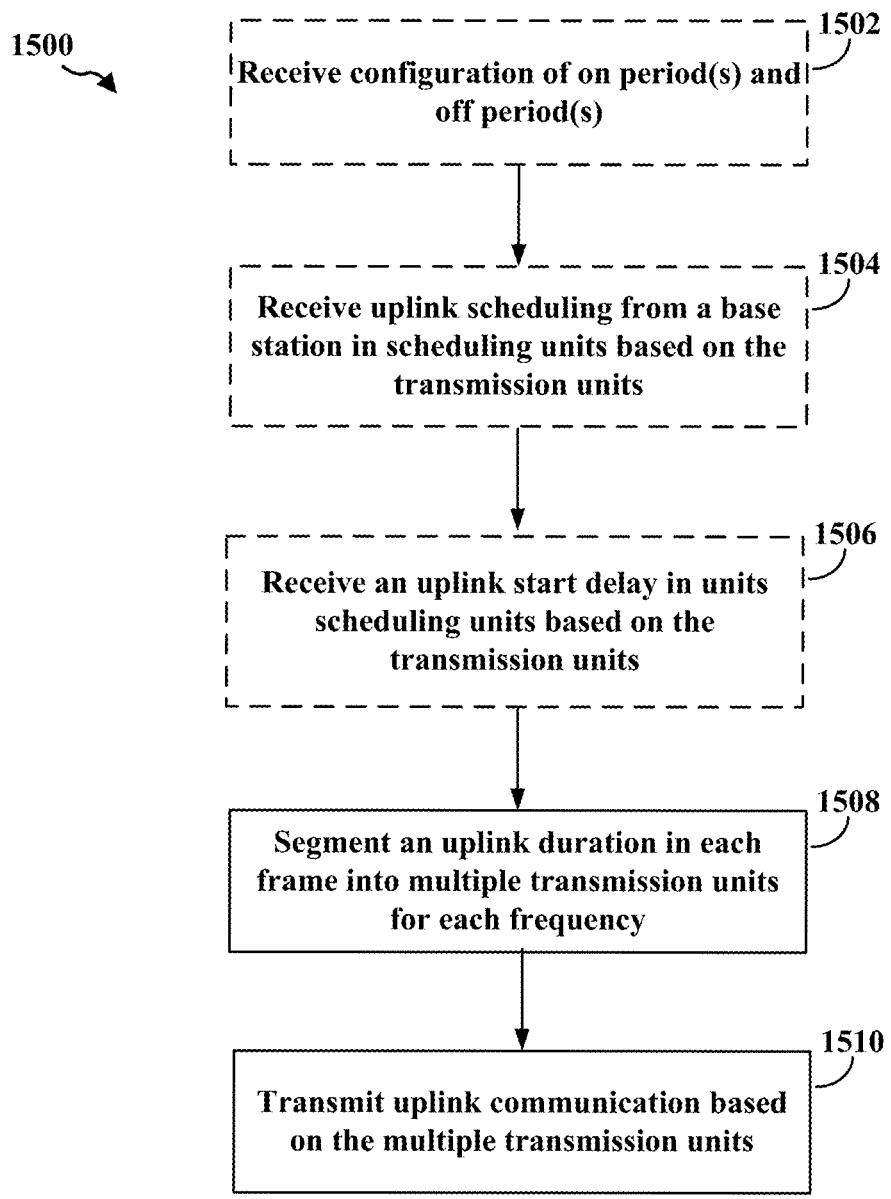
FIG. 15 is a flowchart of a method of wireless communication at a user equipment.

FIG. 15 is a flowchart 1500 of a method of wireless communication. The method may be performed by a UE (e.g., UE 115, 115-a, 115-b, 1350, the apparatus 1602, 1602') communicating wirelessly with a base station (e.g., base station 105, 105-a, 105-b, the apparatus 1302/1302'). The wireless communication may comprise eMTC. Optional aspects of the method are illustrated with a dashed line. At 1508, the UE segments an uplink duration in each frame into multiple transmission units for each frequency, where a frame comprises an integer number of the transmission units, e.g., as described in connection with FIG. 10.

At 1510, the UE transmits uplink communication based on the multiple transmission units, where each transmission unit comprises at least one on period and at least one off period corresponding to each of a plurality of frequencies, wherein during an on period the UE transmits uplink communication on the corresponding frequency and during an off period the UE refrains from transmitting uplink communication on the corresponding frequency.

In one example, each transmission unit may comprise multiple on periods and multiple off periods. The on period(s) and the off period(s) may be configured by a base station for each frame type. Thus, the UE may receive a configuration of on period(s)/off period(s) from the base station at 1502. In another example, the on period(s) and the off period(s) may be specified for each frame type.

In one example, each on period may be smaller than each off period. In another example, each on period may have a same length as each off period. For example, each on period may comprise a length of 5 ms and each off period may comprise a length of 5 ms.

The transmission units of the UE may be multiplexed with second transmission units of a second UE, wherein the on period of the transmission units of the UE corresponds to a second off period for the second transmission units of the second UE and the off period of the transmission units of the UE correspond to a second on period for the second transmission units of the second UE, e.g., as described in connection with FIG. 10. As described in connection with FIG. 10, an uplink duration in each frame may be divided into multiple transmission periods. While FIG. 10 illustrates an example with two periods, different numbers of transmission periods may be provided within the uplink duration. Thus, in an example with three UEs, there may be three periods, and each UE may have one on period and the two remaining periods as an off period. The on periods for the UEs may be interleaved for constant use of the spectrum. In an example with four UEs, each UE may be configured with a single on period followed by three off periods, in order to enable the on periods for the four UEs to be interleaved with each other.

The UE may transmit the communication at 1510 without performing an LBT procedure. In another example, the UE may transmit the uplink communication at 1510 subject to an LBT procedure in each transmission unit. In yet another example, the UE may transmit the uplink communication at 1510 subject to an LBT procedure in each on period.

The UE may receive, at 1504, uplink scheduling from a base station in scheduling units based on the transmission units. The uplink communication may be transmitted at 1510 based on the received uplink scheduling at 1504.

The UE may receive, at 1506, an uplink start delay in scheduling units based on the transmission units. The uplink communication may be transmitted at 1510 based on the received uplink start delay at 1506.

DMRS transmissions and PUSCH transmissions within a same transmission unit may be based on a same RV and a same scrambling sequence.

Figure 16:
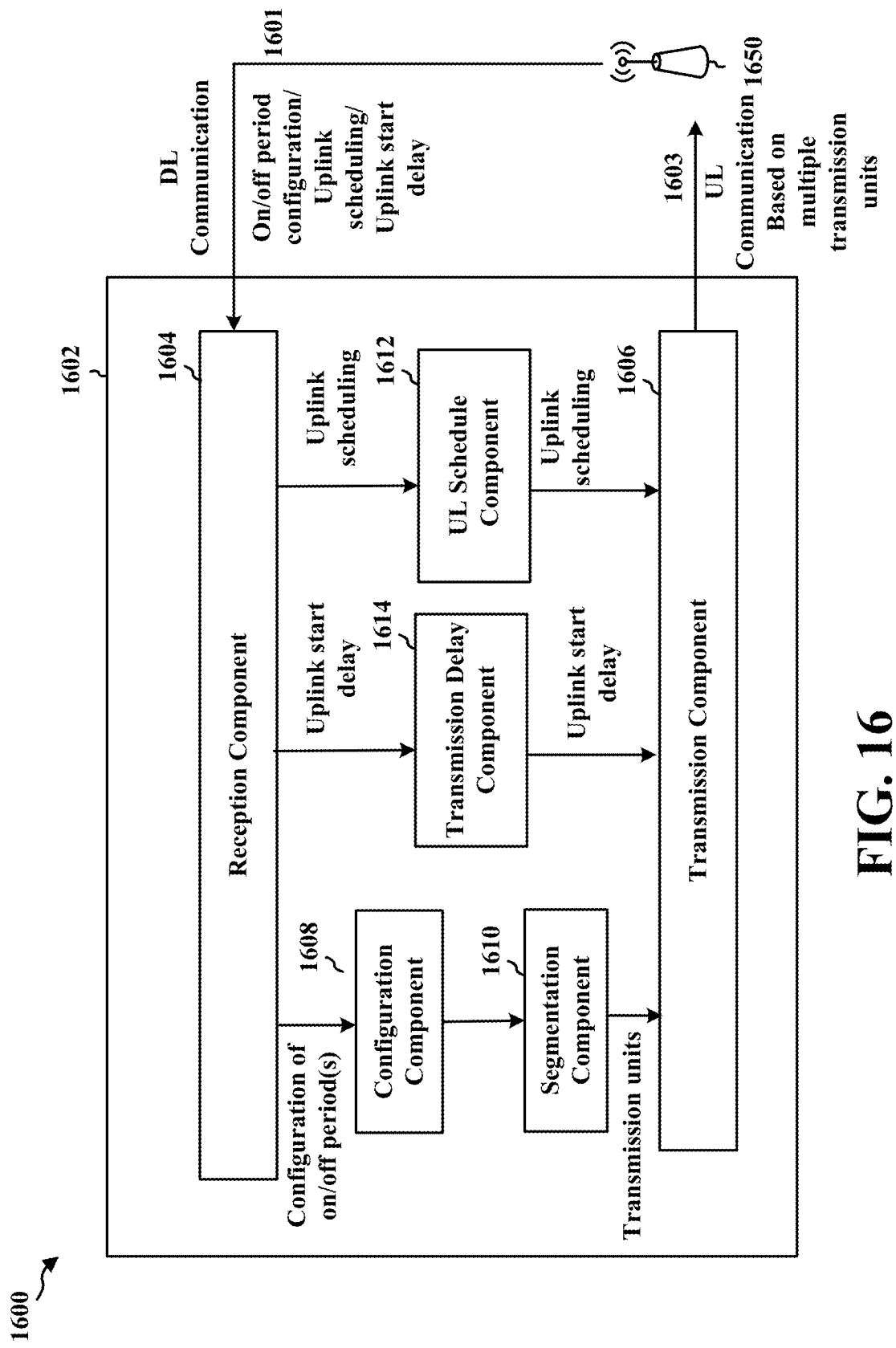
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a UE (e.g., UE 115, 115-a, 115-b, 1350). The apparatus includes a reception component 1604 that receives downlink communication 1601 from a base station 1650 (e.g., base station 105, 105-a, 105-b, the apparatus 1302/1302') and a transmission component 1606 that transmits uplink communication 1603 to base station 1650. The wireless communication may comprise eMTC. The apparatus may include a segmentation component 1610 configured to segment an uplink duration in each frame into multiple transmission units for each frequency, wherein a frame comprises an integer number of the transmission units. The on period and the off period may be configured by a base station or specified for each frame type. Therefore, the apparatus may include a configuration component 1608 configured to receive a configuration of the on/off period(s) from the base station 1650. The transmission component 1606 may be configured to transmit uplink communication based on the multiple transmission units, wherein each transmission unit comprises at least one on period and at least one off period corresponding to each of a plurality of frequencies, wherein during an on period the UE transmits uplink communication on the corresponding frequency and during an off period the UE refrains from transmitting uplink communication on the corresponding frequency. The apparatus may include an uplink schedule component 1612 configured to receive uplink scheduling from a base station in scheduling units based on the transmission units. The transmission component 1606 may transmit uplink communication based on the received uplink scheduling. The apparatus may include a transmission delay component 1614 configured to receive an uplink start delay in scheduling units based on the transmission units. The transmission component 1606 may delay the uplink transmission based on the received uplink start delay.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
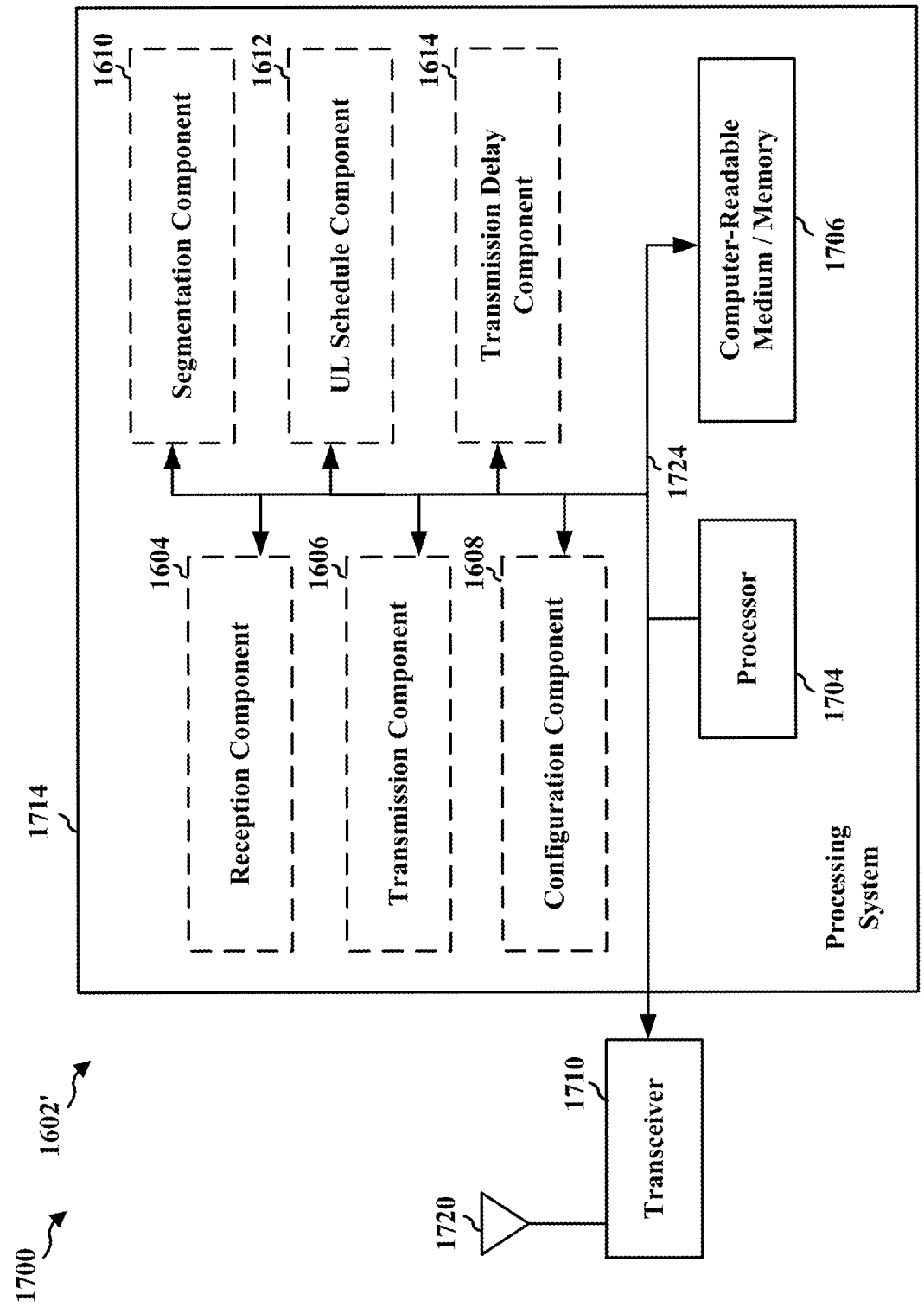
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614. The components may be software components running in the processor 1704, resident/stored in the computer readable medium/memory 1706, one or more hardware components coupled to the processor 1704, or some combination thereof. The processing system 1714 may be a component of the UE 115 and may include the memory 682 and/or at least one of the TX processor 664, the RX processor 658, and the controller/processor 680.

In one configuration, the apparatus 1602/1602' for wireless communication includes means for segmenting an uplink duration in each frame into multiple transmission units for each frequency, wherein a frame comprises an integer number of the transmission units, means for transmitting uplink communication based on the multiple transmission units, wherein each transmission unit comprises at least one on period and at least one off period corresponding to each of a plurality of frequencies, wherein during an on period the UE transmits uplink communication on the corresponding frequency and during an off period the UE refrains from transmitting uplink communication on the corresponding frequency, means for receiving on/off period configuration from a base station, means for receiving uplink scheduling from a base station in scheduling units based on the transmission units, and means for receiving an uplink start delay in scheduling units based on the transmission units.

The processing system 1714 may be a component of the UE 115 and may include the memory 682 and/or at least one of the TX processor 664, the RX processor 658, and the controller/processor 680.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Figure 18:
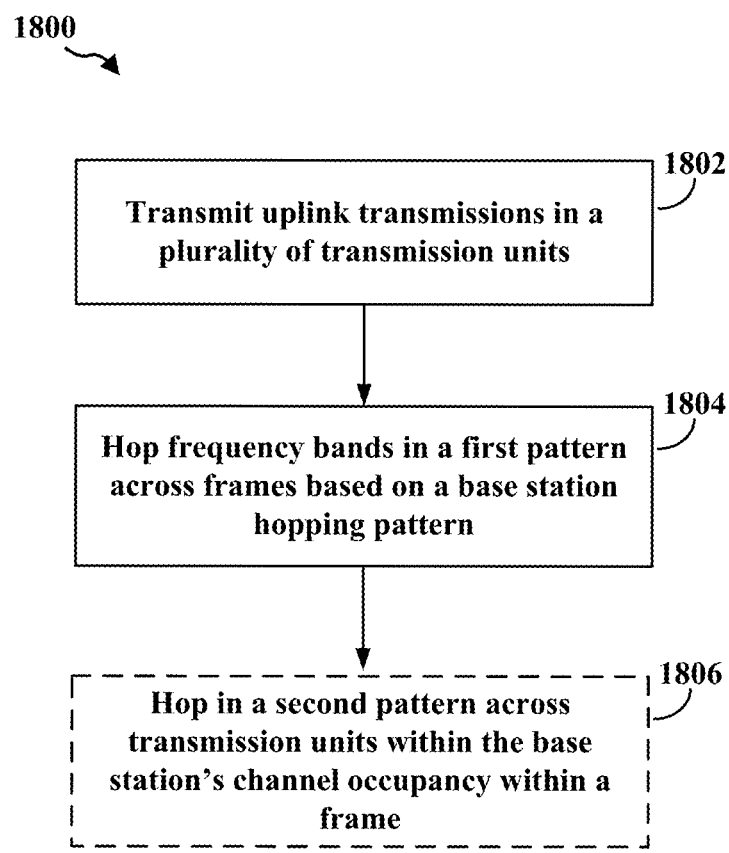
FIG. 18 is a flowchart of a method of wireless communication at a user equipment.

FIG. 18 is a flowchart 1800 of a method of wireless communication. The wireless communication may comprise IoT communication, e.g., eMTC, NB-IoT, etc. The method may be performed by a UE (e.g., UE 115, 115-a, 115-b, 2250, the apparatus 1902, 1902') configured for wireless communication with a base station e.g., base station 105, 105-a, 105-b, 1950, the apparatus 2202/2202'). At 1802, the UE transmits uplink transmissions in a plurality of transmission units. The user equipment may transmit the uplink transmissions without performing an LBT procedure at a beginning of a frame.

At 1804, the UE hops frequency bands in a first pattern across frames based on a base station hopping pattern, e.g., as described in connection with FIG. 11. The first pattern may comprise a fixed pattern.

The uplink transmissions may be transmitted based on dual hopping patterns, e.g., as described in connection with FIG. 11. Therefore, at 1806, the UE may also hop frequency in a second pattern across transmission units within the base station's channel occupancy within a frame. The base station's channel occupancy may comprise a narrowband within a designated frequency band. The user equipment transmits the uplink transmissions in a same narrowband within the corresponding channel occupancy of the base station in each frame. An uplink narrowband and a downlink narrowband for the wireless communication may be different.

Thus, in transmitting the uplink transmission at 1802, the user equipment may hop based on 1804 and 1806.

The user equipment may transmit up to a maximum number of transmission units per frequency before hopping frequency bands. The maximum number may be based on a number of downlink subframes in a frame structure and a number of narrowbands on which the user equipment can hop.

Figure 19:
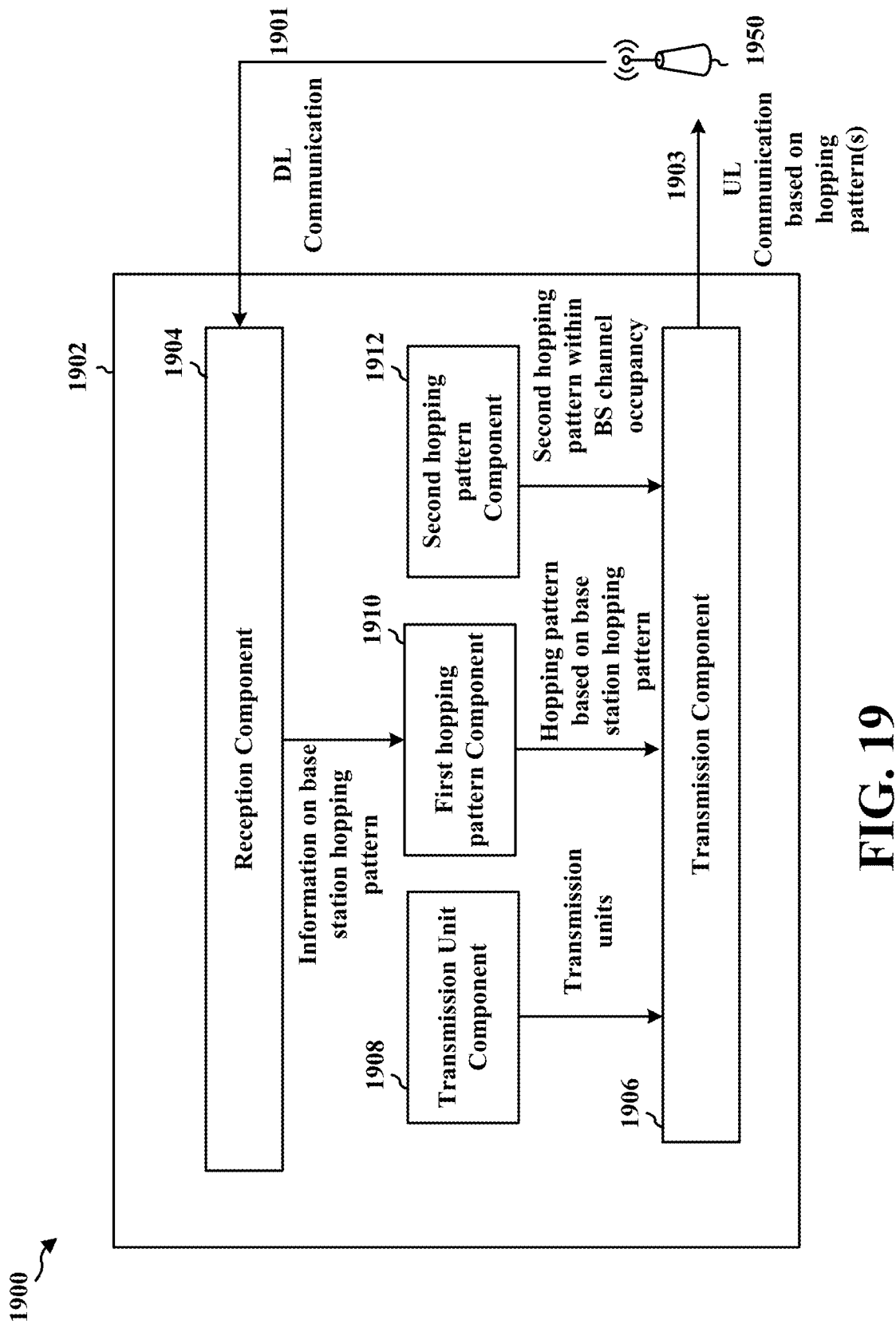
FIG. 19 is a conceptual data flow diagram illustrating the data flow between different means/components in an example apparatus.

FIG. 19 is a conceptual data flow diagram 1900 illustrating the data flow between different means/components in an example apparatus 1902. The apparatus may be a UE (e.g., UE 115, 115-a, 115-b, 2250). The apparatus includes a reception component 1904 that receives downlink communication 1901 from a base station 1950 (e.g., base station 105, 105-a, 105-b, the apparatus 2202/2202') and a transmission component 1906 that transmits uplink communication 1903 to base station 1950. The wireless communication may comprise IoT communication, e.g., eMTC, NB-IoT, etc. The apparatus may comprise a transmission unit component 1908 configured to transmit uplink transmissions in a plurality of transmission units and a first hopping pattern component 1910 configured to hop frequency bands in a first pattern across frames based on a base station hopping pattern. The apparatus may also include a second hopping pattern component 1912 configured to hop in a second pattern across transmission units within the base station's channel occupancy within a frame, wherein the uplink transmissions are transmitted based on dual hopping patterns.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
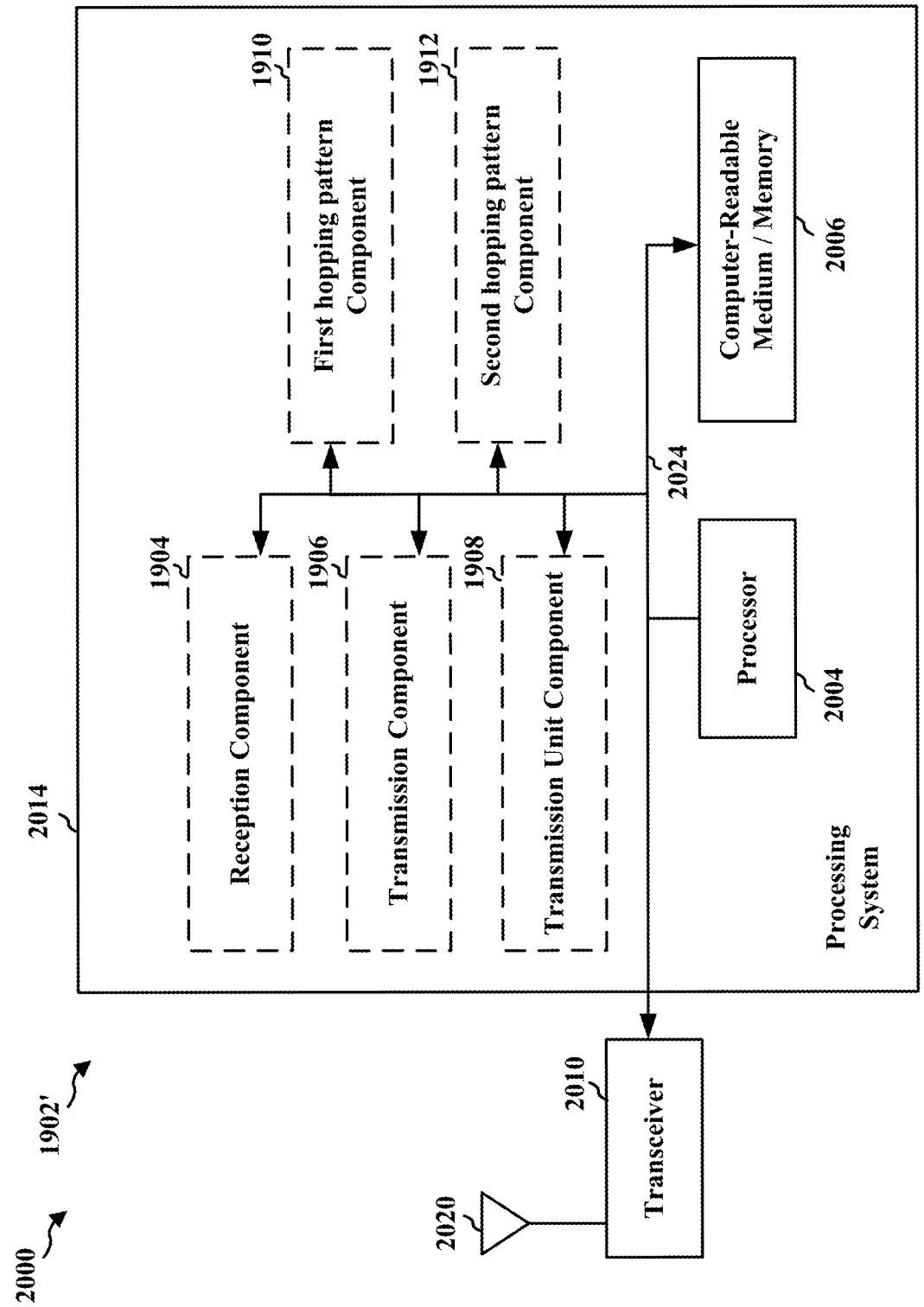
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912. The components may be software components running in the processor 2004, resident/stored in the computer readable medium/memory 2006, one or more hardware components coupled to the processor 2004, or some combination thereof. The processing system 2014 may be a component of the UE 115 and may include the memory 682 and/or at least one of the TX processor 664, the RX processor 658, and the controller/processor 680.

In one configuration, the apparatus 1902/1902' for wireless communication includes means for transmitting uplink transmissions in a plurality of transmission units, means for hopping frequency bands in a first pattern across frames based on a base station hopping pattern, and means for hopping in a second pattern across transmission units within the base station's channel occupancy within a frame.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Figure 21:
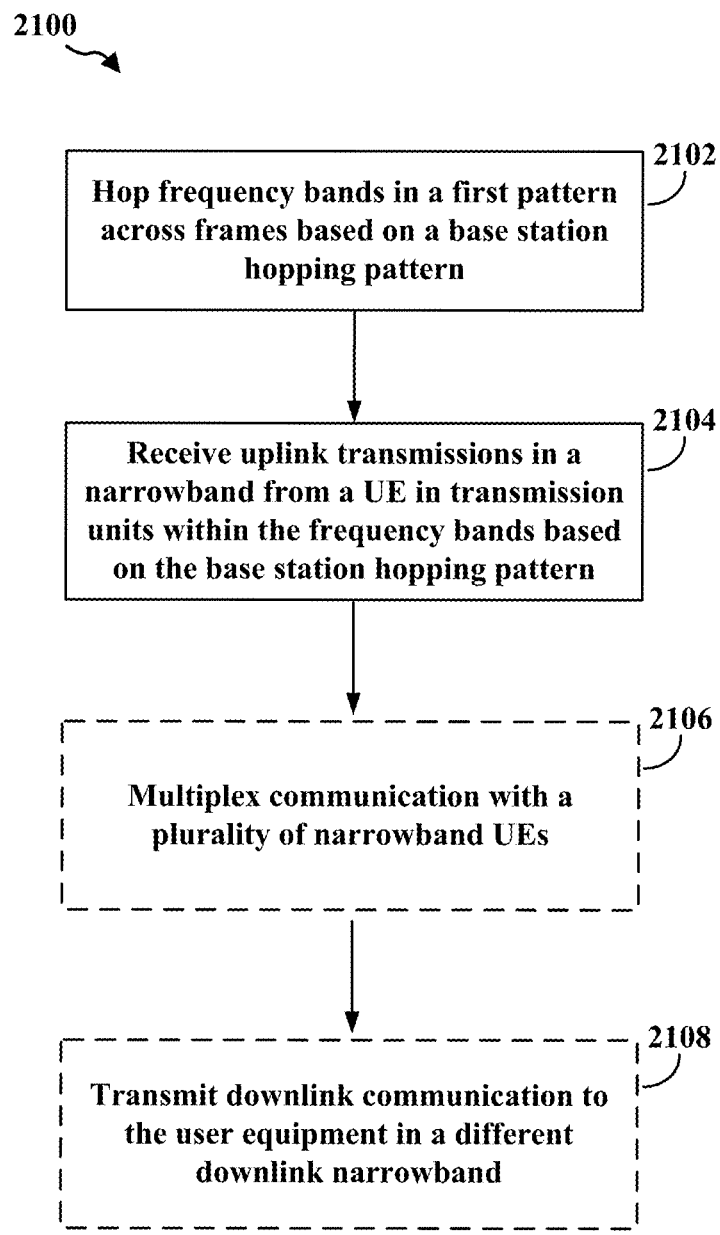
FIG. 21 is a flowchart of a method of wireless communication at a base station.

FIG. 21 is a flowchart 2100 of a method of wireless communication. The wireless communication may comprise IoT communication, e.g., eMTC, NB-IoT, etc. The method may be performed by a base station (e.g., base station 105, 105-a, 105-b, 1950, the apparatus 2202/2202') configured to communicate wirelessly with a UE (e.g., UE 115, 115-a, 115-b, 2250, the apparatus 1902, 1902'). At 2102, the base station hops frequency bands in a first pattern across frames based on a base station hopping pattern, e.g., as described in connection with FIG. 11. At 2104, the base station receives uplink transmissions in a narrowband from a UE in a plurality of transmission units within the frequency bands based on the base station hopping pattern. The uplink transmission may be received from the user equipment based on dual hopping patterns, wherein the UE hops in a second pattern across transmission units within the base station's channel occupancy within a frame. The uplink transmission may be received from the user equipment in the same narrowband within the corresponding channel occupancy of the base station in each frame.

The base station may comprise a wideband base station. Therefore, the base station may multiplex communication with a plurality of narrowband UEs at 2106.

The uplink transmission may be received in an uplink narrowband, and the base station may transmit downlink communication to the user equipment in a downlink narrowband, wherein the uplink narrowband is different than the downlink narrowband at 2108.

The base station may hop frequency channels in the first pattern across frames in coordination with at least one neighbor base station to occupy different frequency channels than the at least one neighbor base station. The hopping may be performed across a number of frequency channels, the number being based on a bandwidth used by the base station. The number may be further based on based on a minimum number of frequencies required by the user equipment.

Figure 22:
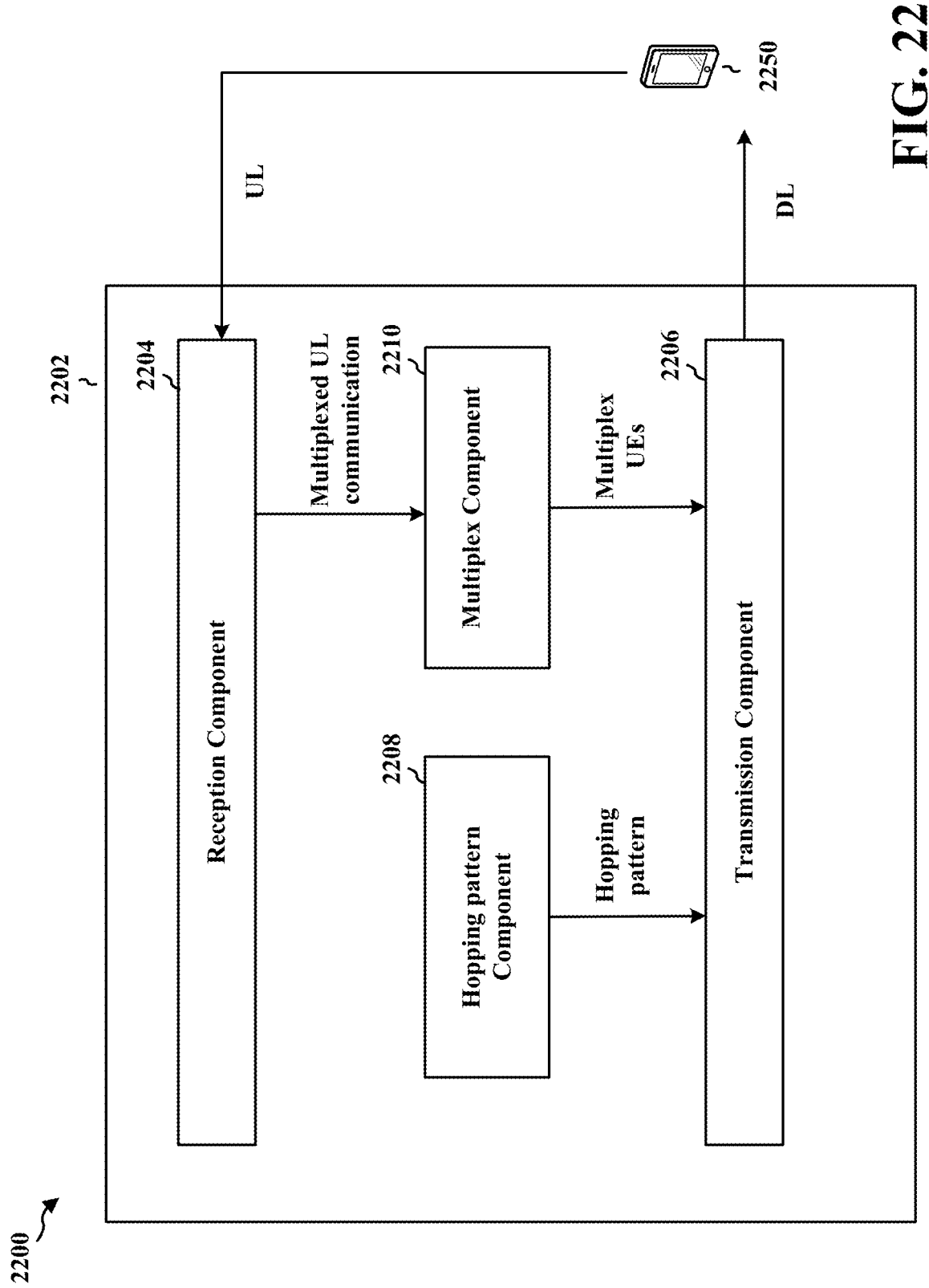
FIG. 22 is a conceptual data flow diagram illustrating the data flow between different means/components in an example apparatus.

FIG. 22 is a conceptual data flow diagram 2200 illustrating the data flow between different means/components in an example apparatus 2202. The apparatus may be a base station (e.g., base station 105, 105-a, 105-b, 1950). The apparatus includes a reception component 2204 that receives UL communication from a UE (e.g., UE 115, 115-a, 115-b, 2250, the apparatus 1902, 1902') and a transmission component 2206 that transmits downlink communication to the UE 2250. The wireless communication may comprise IoT communication, e.g., eMTC, NB-IoT, etc. The apparatus may include a hopping component 2208 configured to hop frequency bands in a first pattern across frames based on a base station hopping pattern. The reception component 2204 may be configured to receive uplink transmissions in a narrowband from a user UE in a plurality of transmission units within the frequency bands based on the base station hopping pattern. The uplink transmission may be received from the user equipment based on dual hopping patterns, wherein the UE hops in a second pattern across transmission units within the base station's channel occupancy within a frame. The uplink transmission may be received from the user equipment in the same narrowband within the corresponding channel occupancy of the base station in each frame.

The apparatus may comprise a wideband base station and may include a multiplex component 2210 configured to multiplex communication with a plurality of narrowband UEs.

The uplink transmission may be received in an uplink narrowband. The transmission component 2206 may be configured to transmit downlink communication to the user equipment in a downlink narrowband, wherein the uplink narrowband is different than the downlink narrowband.

The apparatus may include additional components that perform each of the blocks of the algorithm in the aforementioned flowchart of FIG. 21. As such, each block in the aforementioned flowchart of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
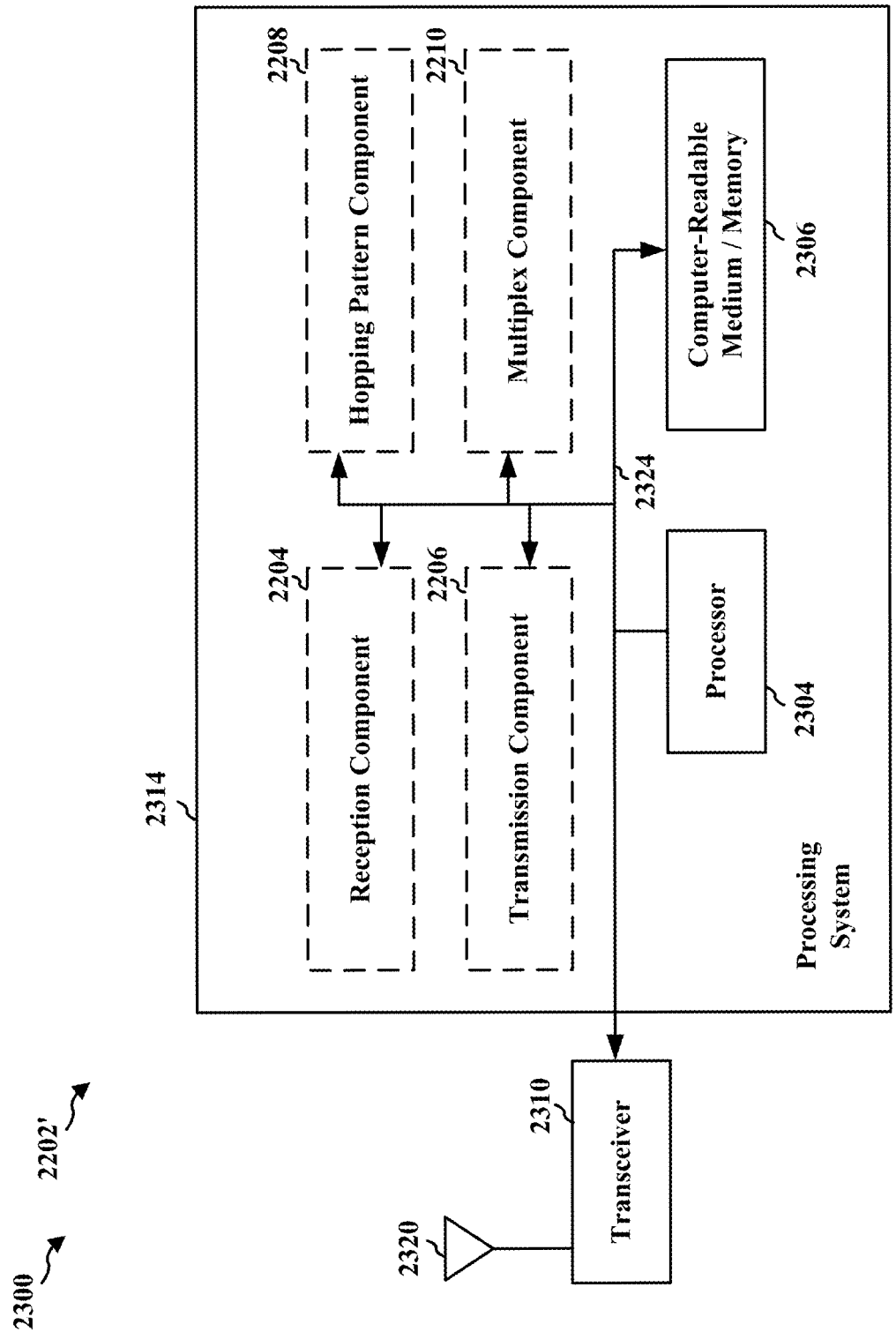
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2210, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2206, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2210. The components may be software components running in the processor 2304, resident/stored in the computer readable medium/memory 2306, one or more hardware components coupled to the processor 2304, or some combination thereof. The processing system 2314 may be a component of the base station 105 and may include the memory 642 and/or at least one of the TX processor 620, the RX processor 638, and the controller/processor 640.

In one configuration, the apparatus 2202/2202' for wireless communication includes means for means for hopping frequency bands in a first pattern across frames based on a base station hopping pattern, means for receiving uplink transmissions in a narrowband from a user equipment (UE) in a plurality of transmission units within the frequency bands based on the base station hopping pattern, means for multiplexing communication with a plurality of narrowband UEs, and means for transmitting downlink communication to the user equipment in a downlink narrowband, wherein the uplink narrowband is different than the downlink narrowband. The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Figure 24:
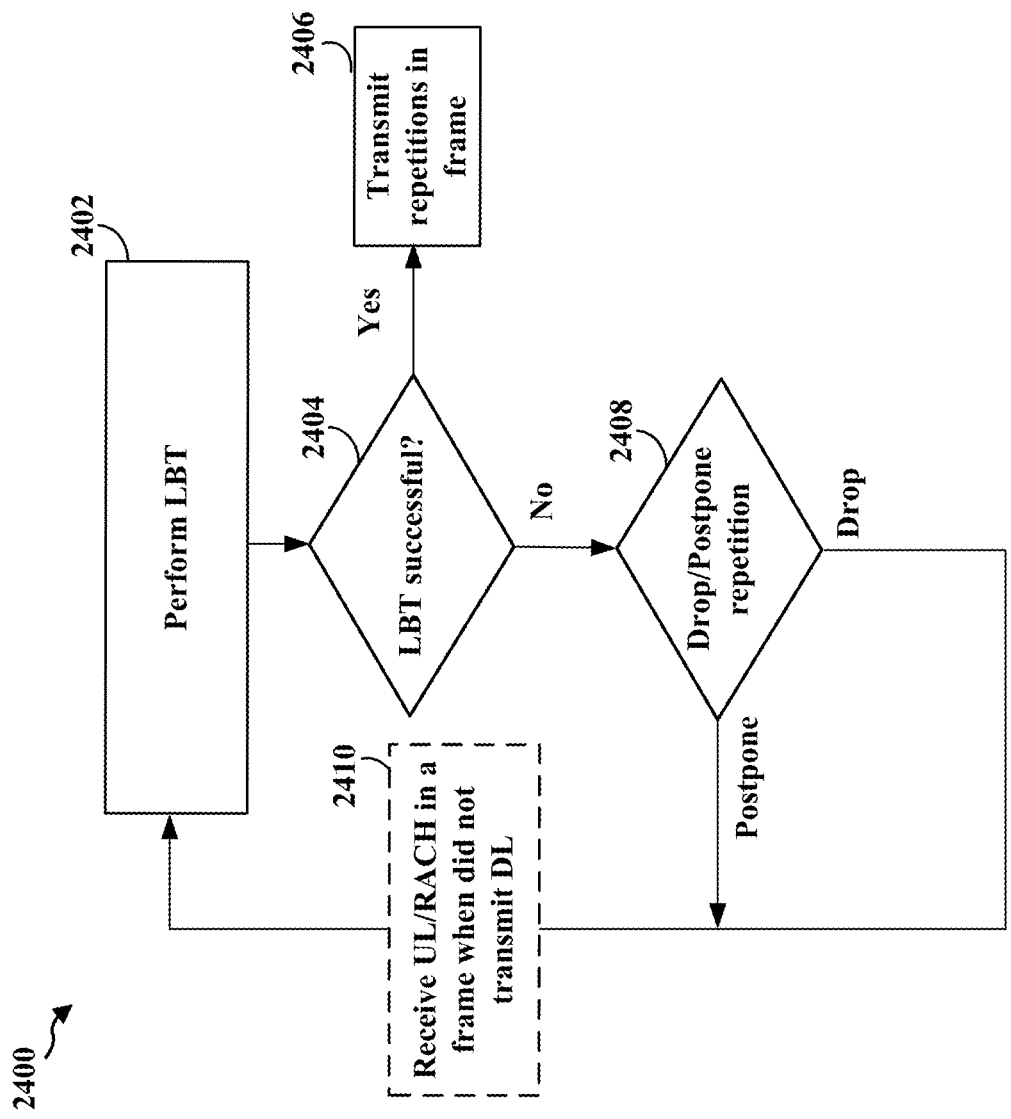
FIG. 24 is a flowchart of a method of wireless communication at a base station.

FIG. 24 is a flowchart 2400 of a method of wireless communication. The wireless communication may comprise IoT communication, e.g., eMTC, NB-IoT, etc. The method may be performed by a base station (e.g., base station 105, 105-a, 105-b, 2850, the apparatus 2502/2502') configured to communicate wirelessly with a UE (e.g., UE 115, 115-a, 115-b, 2550, the apparatus 2802, 2802'). At 2402, the base station performs performing an LBT procedure at a beginning of each of a plurality of frames. At 2406, the base station transmits a plurality of repetitions of a transmission. The base station transmission may comprise a control channel transmission, e.g., an MPDCCH transmission. The transmission may comprise a data transmission, e.g., an MPDSCH transmission. When the plurality of repetitions span multiple frames and an LBT procedure is not successful for a first frame, the base station drops at least one repetition in the first frame or postpones the at least one repetition in the first frame until a second frame when the LBT procedure is successful 2404.

At 2408, the base station may determine whether to drop the at least one repetition or postpone the at least one repetition in a frame in which the LBT procedure is unsuccessful. The base station may drop the at least one repetition in the first frame. The base station may postpone the at least one repetition in the first frame until the second frame when the LBT procedure is successful. The determining at 2408 may be based on at least one of an interference environment, a likelihood of a user equipment missing the transmission directed to the user equipment, a likelihood of the user equipment making a false detection, a reliability of the user equipment detecting whether the base station drops or postpones the transmission, and user equipment procedures of the UE.

At 2410, the base station may receive at least one of an uplink control transmission, an uplink data transmission, or a RACH transmission from a user equipment in the frame when the base station did not transmit a downlink transmission. The base station may receive the RACH transmission from the user equipment, and wherein the RACH transmission is based on an allocated cell specific configuration.

Figure 25:
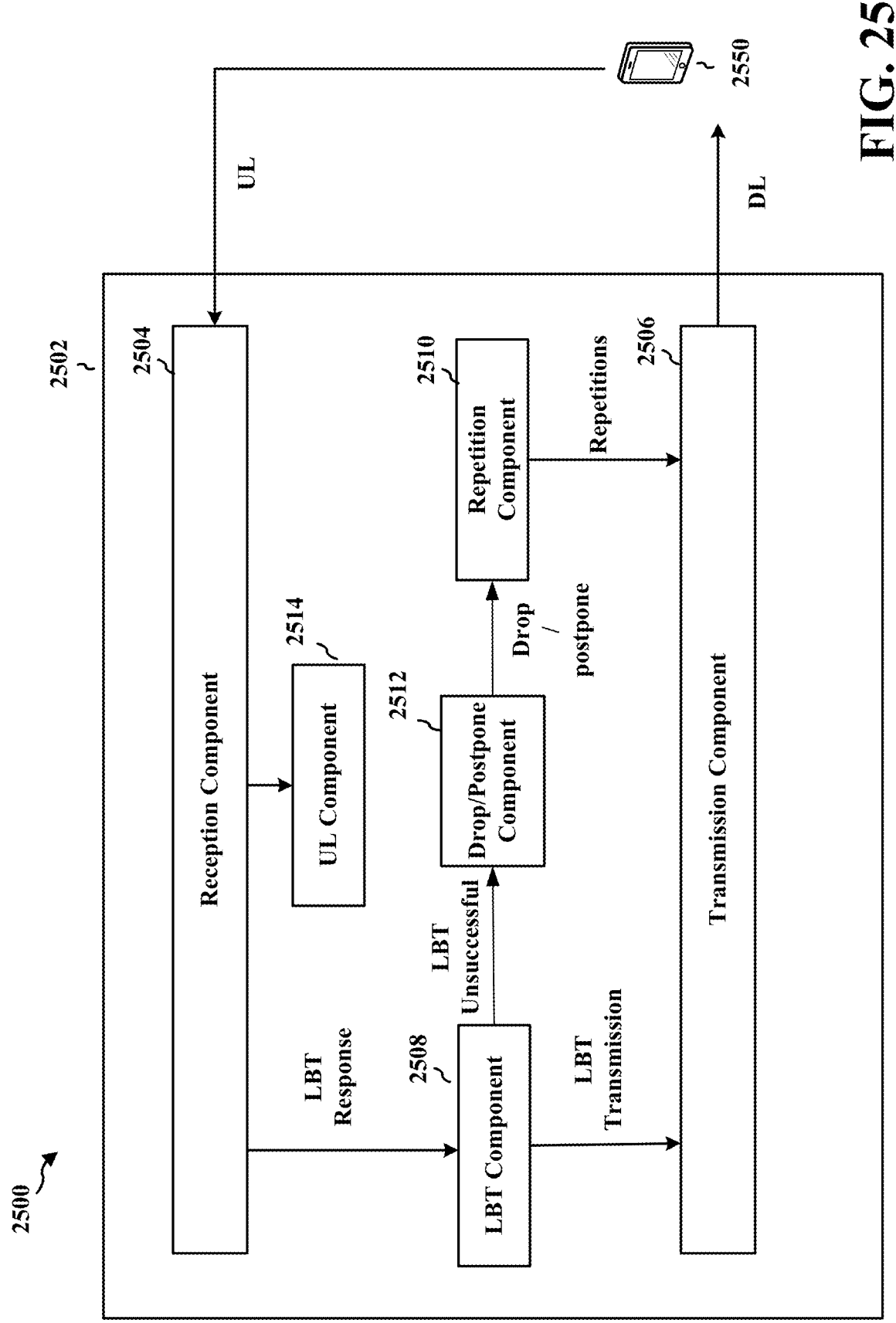
FIG. 25 is a conceptual data flow diagram illustrating the data flow between different means/components in an example apparatus.

FIG. 25 is a conceptual data flow diagram 2500 illustrating the data flow between different means/components in an example apparatus 2502. The apparatus may be a base station (e.g., base station 105, 105-a, 105-b, 2850) configured to communicate wirelessly with a UE (e.g., UE 115, 115-a, 115-b, 2550, the apparatus 2802, 2802'). The wireless communication may comprise IoT communication, e.g., eMTC, NB-IoT, etc. The apparatus includes a reception component 2504 that receives uplink communication from UE 2550 and a transmission component 2506 that transmits downlink communication to UE 2250. The apparatus may include an LBT component 2508 configured to perform an LBT procedure at a beginning of each of a plurality of frames. The apparatus may include a repetition component 2510 configured to transmit a plurality of repetitions of a transmission, wherein when the plurality of repetitions span multiple frames. When the LBT procedure is not successful for a first frame, the repetition component 2510 may drop at least one repetition in the first frame or postpone the at least one repetition in the first frame until a second frame when the LBT procedure is successful. The apparatus may include a drop/postpone component 2512 configured to determine whether to drop the at least one repetition or postpone the at least one repetition in a frame in which the LBT procedure is unsuccessful. The apparatus may include an UL component 2514 configured to receive at least one of an uplink control transmission, an uplink data transmission, or a RACH transmission from a user equipment in the frame when the base station did not transmit a downlink transmission.

The apparatus may include additional components that perform each of the blocks of the algorithm in the aforementioned flowchart of FIG. 24. As such, each block in the aforementioned flowcharts of FIG. 24 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 26:
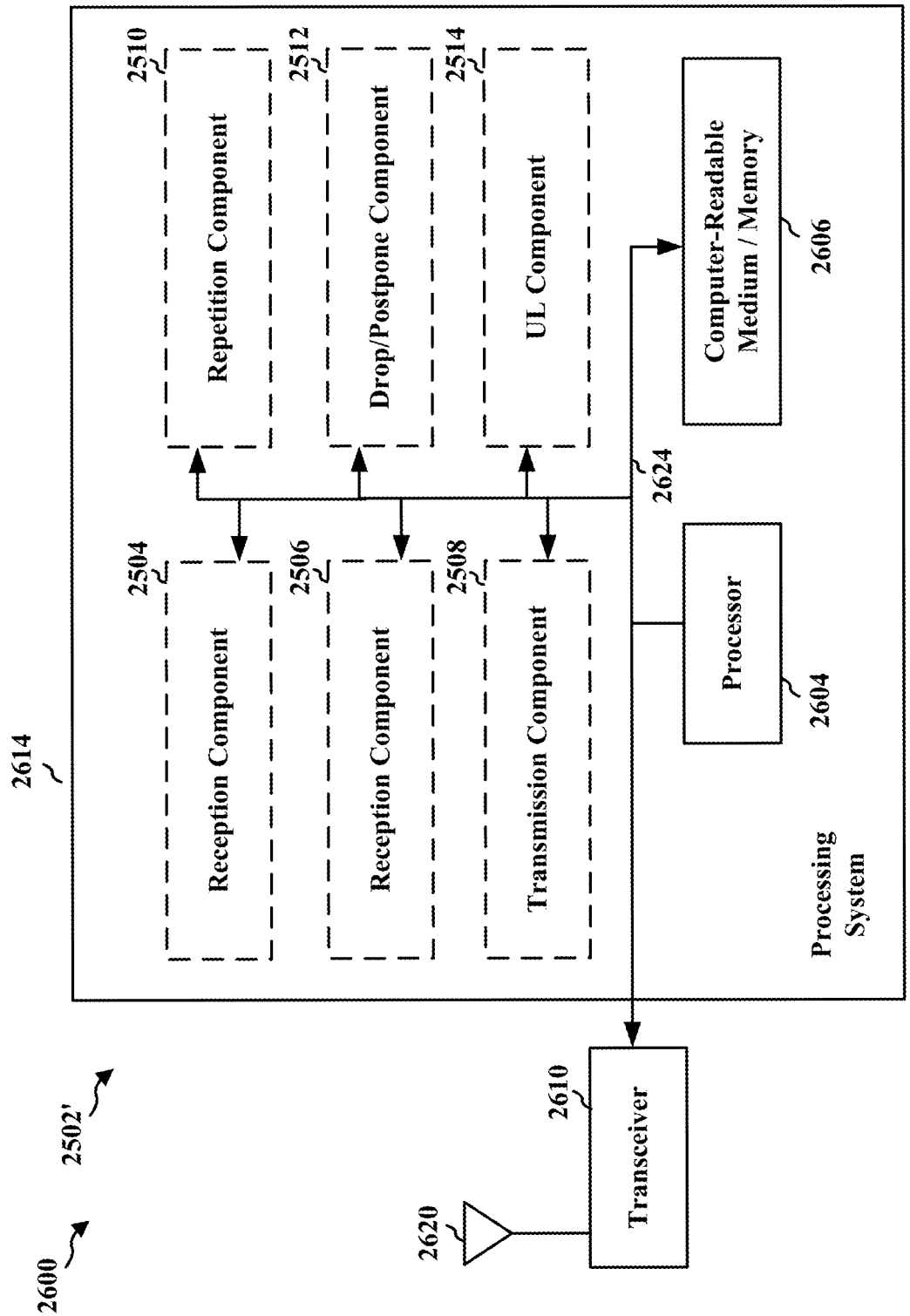
FIG. 26 is a diagram illustrating an example of a hardware implementation for an apparatus employing a processing system.

FIG. 26 is a diagram 2600 illustrating an example of a hardware implementation for an apparatus 2502' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware components, represented by the processor 2604, the components 2504, 2506, 2508, 2510, 2512, and the computer-readable medium/memory 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception component 2504. In addition, the transceiver 2610 receives information from the processing system 2614, specifically the transmission component 2506, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606. The software, when executed by the processor 2604, causes the processing system 2614 to perform the various functions described supra for any particular apparatus. The computer-readable medium/memory 2606 may also be used for storing data that is manipulated by the processor 2604 when executing software. The processing system 2614 further includes at least one of the components 2504, 2506, 2508, 2510, 2512. The components may be software components running in the processor 2604, resident/stored in the computer readable medium/memory 2606, one or more hardware components coupled to the processor 2604, or some combination thereof. The processing system 2614 may be a component of the base station 105 and may include the memory 642 and/or at least one of the TX processor 620, the RX processor 638, and the controller/processor 640.

In one configuration, the apparatus 2502/2502' for wireless communication includes means for performing an LBT procedure at a beginning of each of a plurality of frames, means for transmitting a plurality of repetitions of a transmission, wherein when the plurality of repetitions span multiple frames and the LBT procedure is not successful for a first frame, the base station drops at least one repetition in the first frame or postpones the at least one repetition in the first frame until a second frame when the LBT procedure is successful, means for determining whether to drop the at least one repetition or postpone the at least one repetition in a frame in which the LBT procedure is unsuccessful, and means for receiving at least one of an uplink control transmission, an uplink data transmission, or a RACH transmission from a user equipment in the frame when the base station did not transmit a downlink transmission.

The aforementioned components may be one or more of the aforementioned components of the apparatus 2502 and/or the processing system 2614 of the apparatus 2502' configured to perform the functions recited by the aforementioned means. As described supra, the processing system 2614 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Figure 27:
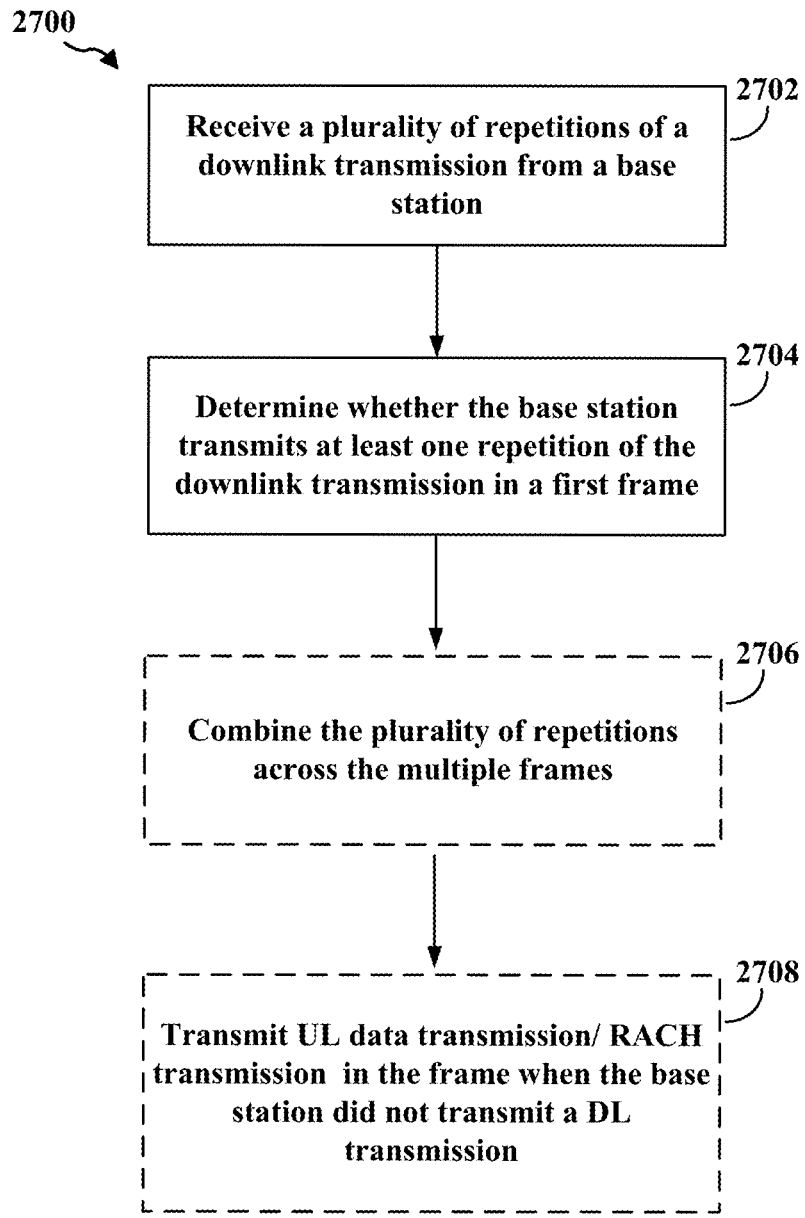
FIG. 27 is a flowchart of a method of wireless communication at a user equipment.

FIG. 27 is a flowchart 2700 of a method of wireless communication. The wireless communication may comprise IoT communication, e.g., eMTC, NB-IoT, etc. The method may be performed by a UE (e.g., UE 115, 115-a, 115-b, 2550, the apparatus 2802, 2802') configured to communicate wirelessly with a base station (e.g., base station 105, 105-a, 105-b, 2850, the apparatus 2502/2502'). At 2702, the UE receives a plurality of repetitions of a downlink transmission from a base station. The transmission may comprise a control channel transmission, e.g., MPDCCH. The transmission may comprise a data transmission, e.g., MPDSCH.

When the plurality of repetitions span multiple frames, the UE determines at 2704 whether the base station transmits at least one repetition of the downlink transmission in a first frame. The determining may include determining whether the base station drops the at least one repetition in the first frame or postpones the at least one repetition in the first frame until a second frame.

At 2706, the UE may combine the plurality of repetitions across the multiple frames.

At 2708, the UE transmits at least one of an uplink control transmission, an uplink data transmission, or a RACH transmission from a user equipment in the frame when the base station did not transmit a downlink transmission. The user equipment may transmit a RACH transmission at 2708 to the base station in the frame when the base station did not transmit the downlink transmission, and the RACH transmission may be based on an allocated cell specific configuration.

Figure 28:
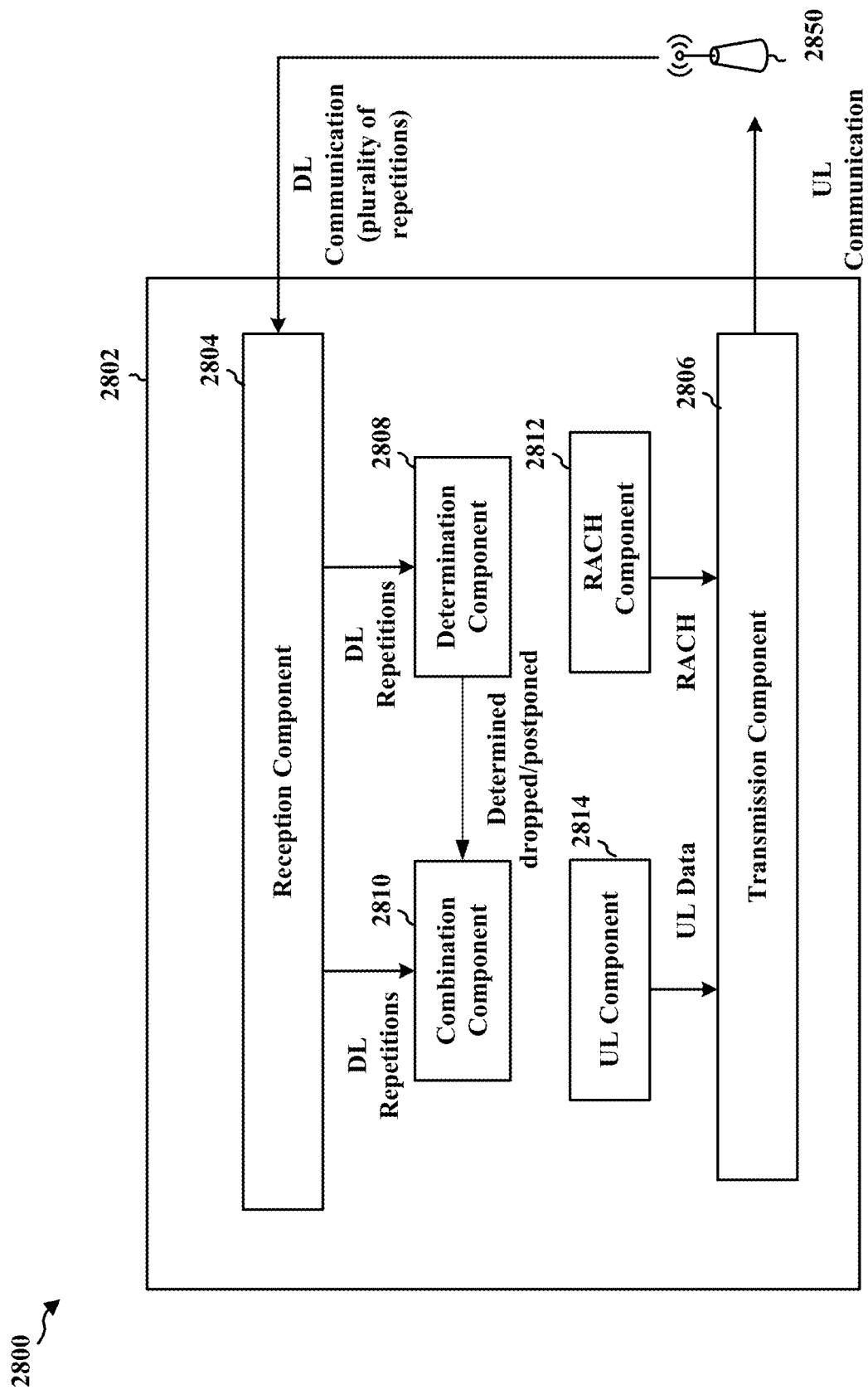
FIG. 28 is a conceptual data flow diagram illustrating the data flow between different means/components in an example apparatus.

FIG. 28 is a conceptual data flow diagram 2800 illustrating the data flow between different means/components in an example apparatus 2802. The apparatus may be a UE (e.g., UE 115, 115-a, 115-b, 2550) configured to communicate wirelessly with a base station (e.g., base station 105, 105-a, 105-b, 2850, the apparatus 2502/2502'). The wireless communication may comprise IoT communication, e.g., eMTC, NB-IoT, etc. The apparatus includes a reception component 2804 that receives downlink communication from base station 2850 and an transmission component that transmits uplink communication to base station 2850.

The reception component 2804 may be configured to receive a plurality of repetitions of a downlink transmission from a base station. The apparatus may include a determination component 2808 configured to determine whether the base station transmits at least one repetition of the downlink transmission in a first frame. The determining may include determining whether the base station drops the at least one repetition in the first frame or postpones the at least one repetition in the first frame until a second frame. The apparatus may include a combination component 2810 configured to combine the plurality of repetitions across the multiple frames. The apparatus may include an UL component 2814 and/or a RACH component 1812 configured to transmit at least one of an uplink control transmission, an uplink data transmission, or a RACH transmission from a user equipment in the frame when the base station did not transmit a downlink transmission.

The apparatus may include additional components that perform each of the blocks of the algorithm in the aforementioned flowchart of FIG. 27. As such, each block in the aforementioned flowchart of FIG. 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 29:
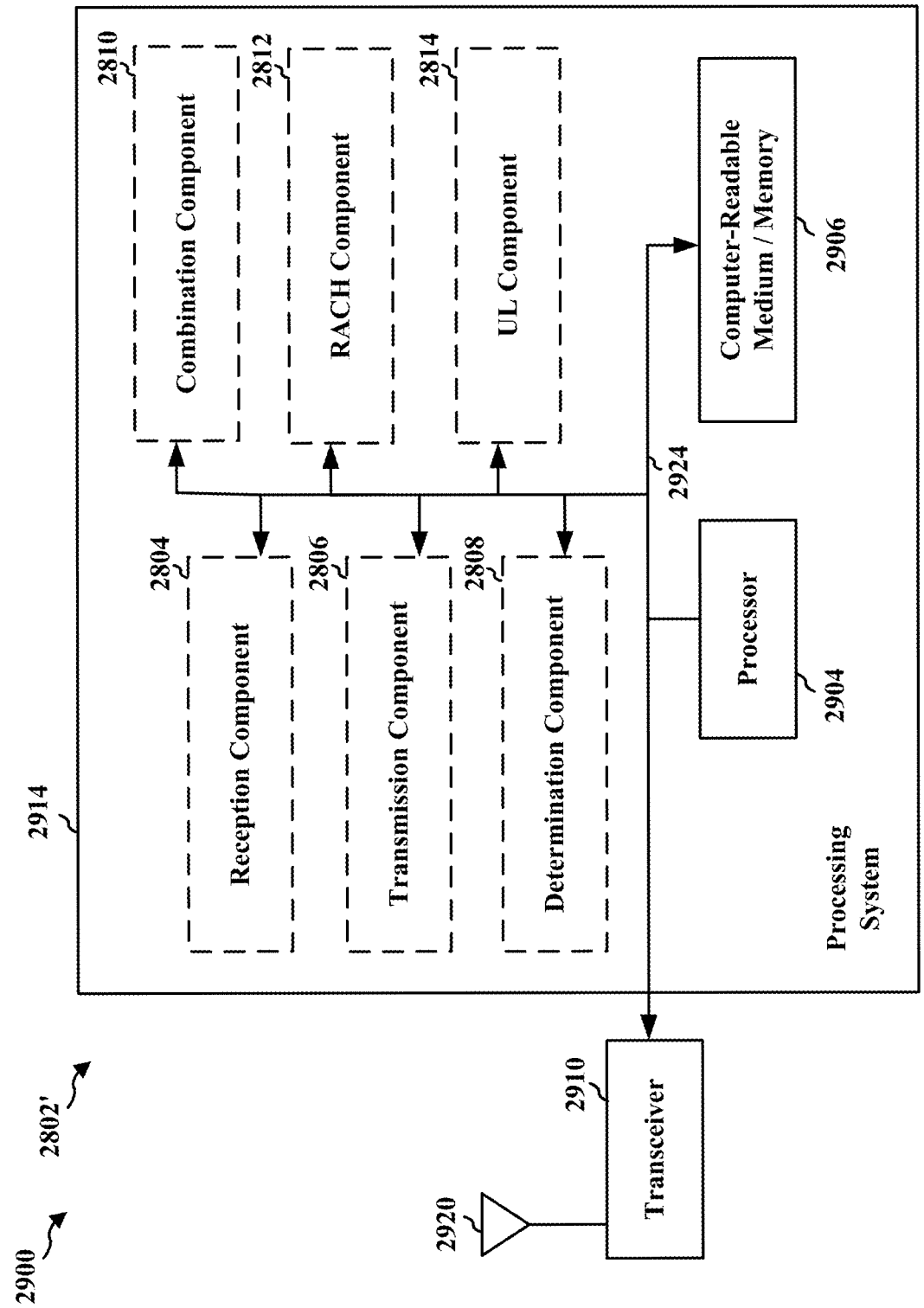
FIG. 29 is a diagram illustrating an example of a hardware implementation for an apparatus employing a processing system.

FIG. 29 is a diagram 2900 illustrating an example of a hardware implementation for an apparatus 2802' employing a processing system 2914. The processing system 2914 may be implemented with a bus architecture, represented generally by the bus 2924. The bus 2924 may include any number of interconnecting buses and bridges depending on the specific application of the processing system 2914 and the overall design constraints. The bus 2924 links together various circuits including one or more processors and/or hardware components, represented by the processor 2904, the components 2804, 2806, 2808, 2810, 2812, 2814, and the computer-readable medium/memory 2906. The bus 2924 may also link various other circuits such as timing sources, peripherals, voltage regulators, and power management circuits, which are well known in the art, and therefore, will not be described any further.

The processing system 2914 may be coupled to a transceiver 2910. The transceiver 2910 is coupled to one or more antennas 2920. The transceiver 2910 provides a means for communicating with various other apparatus over a transmission medium. The transceiver 2910 receives a signal from the one or more antennas 2920, extracts information from the received signal, and provides the extracted information to the processing system 2914, specifically the reception component 2804. In addition, the transceiver 2910 receives information from the processing system 2914, specifically the transmission component 2806, and based on the received information, generates a signal to be applied to the one or more antennas 2920. The processing system 2914 includes a processor 2904 coupled to a computer-readable medium/memory 2906. The processor 2904 is responsible for general processing, including the execution of software stored on the computer-readable medium/memory 2906. The software, when executed by the processor 2904, causes the processing system 2914 to perform the various functions described supra for any particular apparatus. The computer-readable medium/memory 2906 may also be used for storing data that is manipulated by the processor 2904 when executing software. The processing system 2914 further includes at least one of the components 2804, 2806, 2808, 2810, 2812, 2814. The components may be software components running in the processor 2904, resident/stored in the computer readable medium/memory 2906, one or more hardware components coupled to the processor 2904, or some combination thereof. The processing system 2914 may be a component of the UE 115 and may include the memory 682 and/or at least one of the TX processor 664, the RX processor 658, and the controller/processor 680.

In one configuration, the apparatus 2802/2802' for wireless communication includes means for receiving a plurality of repetitions of a downlink transmission from a base station, means for determining whether the base station transmits at least one repetition of the downlink transmission in a first frame, means for combining the plurality of repetitions across the multiple frames, and means for transmitting at least one of an uplink control transmission, an uplink data transmission, or a RACH transmission from a user equipment in the frame when the base station did not transmit a downlink transmission.

The aforementioned means may be one or more of the aforementioned components of the apparatus 2802 and/or the processing system 2914 of the apparatus 2802' configured to perform the functions recited by the aforementioned means. As described supra, the processing system 2914 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    performing a dual clear channel assessment (CCA) procedure for a frame prior to transmitting a transmission, wherein the dual CCA procedure comprises CCA followed by a first extended CCA (eCCA) when the CCA is unsuccessful;

transmitting the transmission during the frame when at least one CCA procedure of the dual CCA procedure is successful;

refraining from transmitting during the frame when both CCA procedures of the dual CCA procedure are unsuccessful; and when the CCA and the first eCCA of the dual CCA procedure are unsuccessful:
waiting until a next CCA location at a next frame boundary following the frame in which the CCA and the first eCCA are performed; and
performing a second eCCA at the next CCA location prior to transmitting the transmission, wherein the second eCCA comprises a next eCCA following the dual CCA procedure and is performed at the next CCA location without performing a new CCA at the next CCA location.

2. The method of claim 1, wherein performing the dual CCA procedure comprises:
performing the CCA for a first period of time; and
performing the first eCCA for a second period of time following the CCA, when the CCA is unsuccessful.

3. The method of claim 2, wherein the second period of time is longer than the first period of time.

4. The method of claim 1, further comprising:
transmitting a reservation signal when the CCA is successful; and
transmitting the transmission following the reservation signal.

5. The method of claim 1, further comprising:
transmitting a reservation signal when the first eCCA or the second eCCA is successful; and
transmitting the transmission following the reservation signal.

6. The method of claim 1, wherein a first transmission time corresponding to the CCA is independent of a first duration of the CCA and a second transmission time corresponding to the first eCCA or the second eCCA is based on a second duration of the first eCCA or the second eCCA.

7. The method of claim 1, wherein the dual CCA procedure is performed when the base station transmitted on a previous frame or prior to the base station transmitting the frame as a first frame on a frequency.

8. The method of claim 1, wherein the wireless communication comprises enhanced machine type communication (eMTC).

9. An apparatus for wireless communication at a base station comprising:
means for performing a dual clear channel assessment (CCA) procedure for a frame prior to transmitting a transmission, wherein the dual CCA procedure comprises CCA followed by a first extended CCA (eCCA) when the CCA is unsuccessful;
means for transmitting the transmission during the frame when at least one CCA procedure of the dual CCA procedure is successful; and
means for refraining from transmitting during the frame when both CCA procedures of the dual CCA procedure are unsuccessful, wherein when the CCA and the first eCCA of the dual CCA procedure are unsuccessful:
the means for refraining waits until a next CCA location at a next frame boundary following the frame in which the CCA and the first eCCA are performed, and
the means for performing a dual CCA procedure performs a second eCCA at the next CCA location prior to transmitting the transmission, wherein the second eCCA comprises a next eCCA following the dual CCA procedure and is performed at the next CCA location without performing a new CCA at the next CCA location.

10. The apparatus of claim 9, wherein the means for performing the dual CCA procedure performs the CCA for a first period of time and performs the first eCCA for a second period of time following the CCA, when the CCA is unsuccessful.

11. The apparatus of claim 10, wherein the second period of time is longer than the first period of time.

12. The apparatus of claim 9, wherein the means for transmitting transmits a reservation signal when the CCA is successful and transmits the transmission following the reservation signal.

13. The apparatus of claim 9, wherein the means for transmitting transmits a reservation signal when the first eCCA or the second eCCA is successful and transmits the transmission following the reservation signal.

14. The apparatus of claim 9, wherein a first transmission time corresponding to the CCA is independent of a first duration of the CCA and a second transmission time corresponding to the first eCCA or the second eCCA is based on a second duration of the first eCCA or the second eCCA.

15. The apparatus of claim 9, wherein the dual CCA procedure is performed when the base station transmitted on a previous frame or prior to the base station transmitting the frame as a first frame on a frequency.

16. The apparatus of claim 9, wherein the wireless communication comprises enhanced machine type communication (eMTC).

17. An apparatus for wireless communication at a base station comprising:
a memory; and
at least one processor coupled to the memory and configured to:
perform a dual clear channel assessment (CCA) procedure for a frame prior to transmitting a transmission, wherein the dual CCA procedure comprises CCA followed by a first extended CCA (eCCA) when the CCA is unsuccessful;
transmit the transmission during the frame when at least one CCA procedure of the dual CCA procedure is successful;
refrain from transmitting during the frame when both CCA procedures of the dual CCA procedure are unsuccessful; and
when the CCA and the first eCCA of the dual CCA procedure are unsuccessful:
wait until a next CCA location at a next frame boundary following the frame in which the CCA and the first eCCA are performed; and
perform a second eCCA at the next CCA location prior to transmitting the transmission, wherein the second eCCA comprises a next eCCA following the dual CCA procedure and is performed at the next CCA location without performing a new CCA at the next CCA location.

18. The apparatus of claim 17, wherein performing the dual CCA procedure comprises:
performing the CCA for a first period of time; and
performing the first eCCA for a second period of time following the CCA, when the CCA is unsuccessful.

19. The apparatus of claim 18, wherein the second period of time is longer than the first period of time.

20. The apparatus of claim 17, wherein the at least one processor is further configured to:

transmit a reservation signal when the CCA is successful; and transmit the transmission following the reservation signal.

21. The apparatus of claim 17, wherein the at least one processor is further configured to:

transmit a reservation signal when the first eCCA or the second eCCA is successful; and transmit the transmission following the reservation signal.

22. The apparatus of claim 17, wherein a first transmission time corresponding to the CCA is independent of a first duration of the CCA and a second transmission time corresponding to the first eCCA or the second eCCA is based on a second duration of the first eCCA or the second eCCA.

23. The apparatus of claim 17, wherein the dual CCA procedure is performed when the base station transmitted on a previous frame or prior to the base station transmitting the frame as a first frame on a frequency.

24. The apparatus of claim 17, wherein the wireless communication comprises enhanced machine type communication (eMTC).

25. A non-transitory computer-readable medium storing computer executable code for wireless communication at a base station, comprising code to:

perform a dual clear channel assessment (CCA) procedure for a frame prior to transmitting a transmission, wherein the dual CCA procedure comprises CCA followed by a first extended CCA (eCCA) when the CCA is unsuccessful;

transmit the transmission during the frame when at least one CCA procedure of the dual CCA procedure is successful;

refrain from transmitting during the frame when both CCA procedures of the dual CCA procedure are unsuccessful; and when the CCA and the first eCCA of the dual CCA procedure are unsuccessful:

wait until a next CCA location at a next frame boundary following the frame in which the CCA and the first eCCA are performed; and perform a second eCCA at the next CCA location prior to transmitting the transmission, wherein the second eCCA comprises a next eCCA following the dual CCA procedure and is performed at the next CCA location without performing a new CCA at the next CCA location.

26. The non-transitory computer-readable medium of claim 25, wherein performing the dual CCA procedure comprises:

performing the CCA for a first period of time; and performing the first eCCA for a second period of time following the CCA, when the CCA is unsuccessful.

27. The non-transitory computer-readable medium of claim 26, wherein the second period of time is longer than the first period of time.

28. The non-transitory computer-readable medium of claim 25, further comprising code to:

transmit a reservation signal when the CCA is successful; and transmit the transmission following the reservation signal.

29. The non-transitory computer-readable medium of claim 25, further comprising code to:

transmit a reservation signal when the first eCCA or the second eCCA is successful; and transmit the transmission following the reservation signal.

30. The non-transitory computer-readable medium of claim 25, wherein a first transmission time corresponding to the CCA procedure is independent of a first duration of the CCA and a second transmission time corresponding to the first eCCA or the second eCCA is based on a second duration of the first eCCA or the second eCCA.

31. The non-transitory computer-readable medium of claim 25, wherein the dual CCA procedure is performed when the base station transmitted on a previous frame or prior to the base station transmitting the frame as a first frame on a frequency.

32. The non-transitory computer-readable medium of claim 25, wherein the wireless communication comprises enhanced machine type communication (eMTC).

33. The method of claim 1, further comprising transmitting the transmission during the frame when the second eCCA is successful.

34. The apparatus of claim 9, wherein the means for transmitting transmits the transmission during the frame when the second eCCA is successful.

35. The apparatus of claim 17, wherein the at least one processor is further configured to transmit the transmission during the frame when the second eCCA is successful.

36. The non-transitory computer-readable medium of claim 25, further comprising code to transmit the transmission during the frame when the second eCCA is successful.

* * * * *